United States Patent [19]

Fukahori et al.

[11] Patent Number: 4,739,359
[45] Date of Patent: Apr. 19, 1988

[54] ELECTRIC MOTOR OPERATED CAMERA

[75] Inventors: Hidehiko Fukahori; Shosuke Haraguchi; Masanori Ishikawa, all of Kanagawa, Japan

[73] Assignee: Canon Kabushiki Kaisha, Tokyo, Japan

[21] Appl. No.: 821,760

[22] Filed: Jan. 23, 1986

[30] Foreign Application Priority Data

| Jan. 26, 1985 | [JP] | Japan | 60-011778 |
| Jun. 21, 1985 | [JP] | Japan | 60-134215 |
| Jun. 21, 1985 | [JP] | Japan | 60-134216 |
| Jun. 21, 1985 | [JP] | Japan | 60-134217 |
| Jun. 21, 1985 | [JP] | Japan | 60-134218 |
| Nov. 30, 1985 | [JP] | Japan | 60-269852 |

[51] Int. Cl.$^4$ ............... G03B 1/00; G03B 3/10
[52] U.S. Cl. ............... 354/400; 354/195.1; 354/214
[58] Field of Search ............... 354/173.1, 173.11, 412, 354/400, 402, 204, 205, 206, 195.1, 195.12, 214

[56] References Cited

U.S. PATENT DOCUMENTS

| 4,162,837 | 7/1979 | Haragushi | 354/173.1 |
| 4,294,527 | 10/1981 | Hashimoto et al. | 354/173.1 X |
| 4,601,563 | 7/1986 | Miyawaki et al. | 354/173.1 X |
| 4,619,510 | 10/1986 | Nakanishi | 354/173.1 |

Primary Examiner—Perkey W. B.
Attorney, Agent, or Firm—Toren, McGeady & Associates

[57] ABSTRACT

A motor operated camera is capable of using a single electric motor for different operations. A planet gear transmission change-over device is formed within a motor gear train by a sun gear, a planet gear and a plurality of transmission gear which are arranged to be selectively engaged with the planet gear. Blocking means for preventing the revolution of the planet gear at a point where at least one pair consisting of the planet gear and one of the transmission gears engage each other is arranged in combination with unblocking means arranged to undo a blocked state brought about by the blocking means.

11 Claims, 13 Drawing Sheets

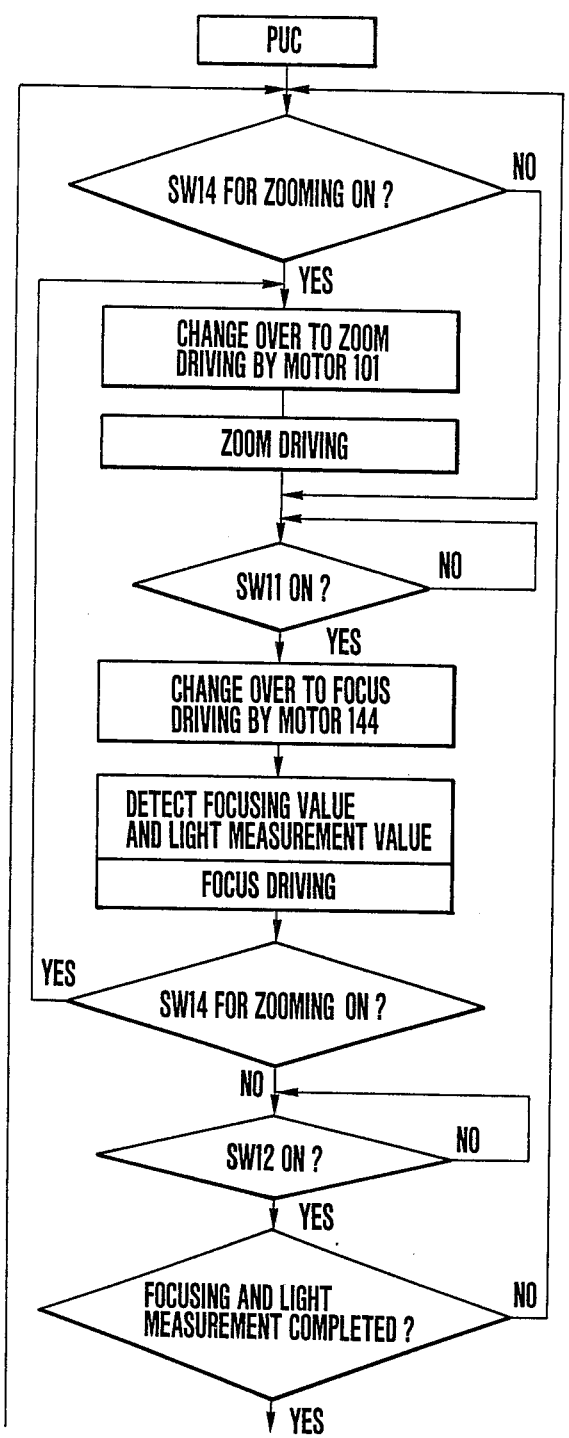
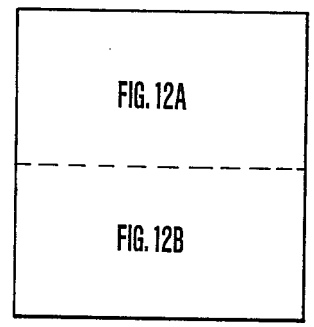

ELECTRIC MOTOR OPERATED CAMERA

BACKGROUND OF THE INVENTION

1. Field of the Invention

This invention relates to a motor operated camera arranged to have various operations thereof performed by the outputs of motors.

2. Description of the Prior Art

Electric motor operated cameras of the kind having a plurality of parts individually driven by switching one transmission system over to another for transmitting the driving force of a motor have been proposed during recent years. Heretofore, the motor operated camera of this kind has been arranged to drive a plurality of parts one after another by mechanically detecting a load and by switching a clutch accordingly. However, the motor is allowed to rotate only in one direction. Energy is wasted for switching the clutch. Further, the mechanical arrangement is complex and produces a disagreeable sound in switching the clutch.

In another prior art device, a transmission system is arranged to be switched by means of a planet gear. It has solved the problem of the disagreeable sound as the transmission system is readily switchable by changing the rotating direction of the motor without making noises. However, since the switching or change-over is effected by a revolving force, the parts to be driven by transmission is rotatable only in one direction and is incapable of being driven for reverse rotation. Therefore, in cases where the parts to be driven must be driven to rotate back and forth, as in the cases of automatic focusing and power zooming devices, these parts are respectively provided with motors for forward and backward rotations separately from each other. However, such arrangement has necessitated the use of a greater number of parts and thus resulted in an increased cost and a larger size of the camera.

To solve these problems, there has been proposed a device which is not only capable of permitting driving operations on a plurality of parts with a single motor by shifting a gear interlocking system by means of an external operation parts but also capable of driving them back and forth. However, this device necessitates an operation from outside as required. Besides, the arrangement has given a disagreeable feeling when operated from outside. There has been proposed another device which permits an automatic operation with electromagnetic clutches arranged on both output shafts of a motor. That device, however, necessitates use of two electromagnetic clutches which are expensive in addition to the motor and thus has caused an increase in cost. Besides, during operation, electric currents must flow also to the electromagnetic clutches to lower efficiency in terms of energy consumption. It has been a further disadvantage of that device that the great moment of inertia of the electromagnetic clutch degrades the controllability of them in bringing them to a stop at predetermined positions.

In addition to these prior art devices, there has been proposed a driving force transmission device wherein a driving gear is arranged to be movable in a thrust direction to change over the engagement of the driving gear from one follower gear to another, so that forward and backward driving operations can be performed in two channels. However, the driving gear is moved generally by means of a plunger or the like, for example, with an electromagnet. Therefore, the arrangement necessitates use of additional driving force generating means for generating a driving force required for the above-stated change-over of engagement. Further, at the time of the change-over movement in the thrust direction, the teeth of the driving gear might collide with those of the follower gear to cause some damage. Besides, this possibility necessitates some suitable impact absorbing arrangement.

SUMMARY OF THE INVENTION

It is an object of this invention to provide a motor operated camera which has many complex camera operation systems arranged to be driven with a few drive sources.

The above and further objects and features of the invention will become apparent from the following detailed description of preferred embodiments thereof taken in connection with the accompanying drawings.

BRIEF DESCRIPTION OF THE DRAWINGS

FIGS. 12, 12(A), and 12(B) show in flow charts the operation of a camera arranged as a fourth embodiment of this invention.

DETAILED DESCRIPTION OF THE PREFERRED EMBODIMENTS

Figure 1:
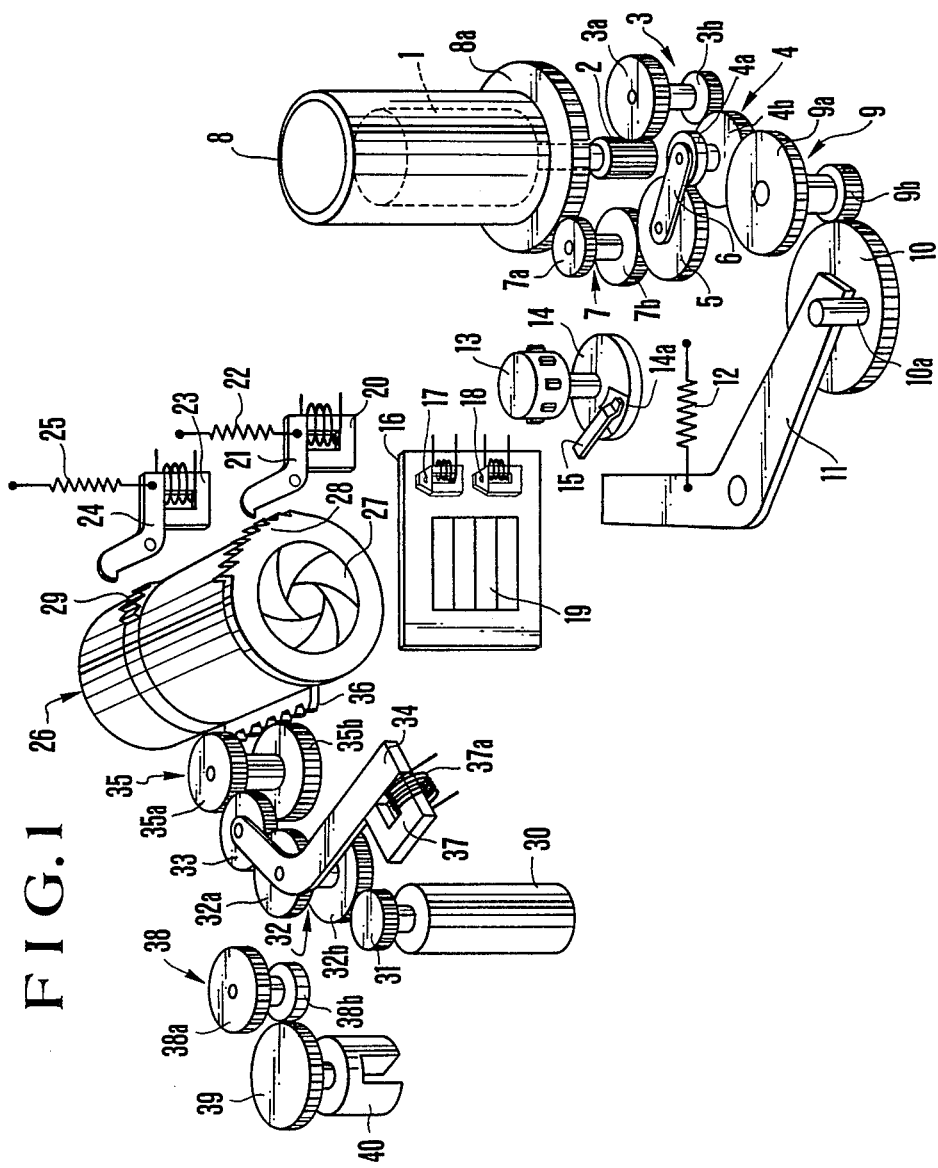
FIGS. 1, 2 and 3 are oblique views showing the operation of an electric motor operated camera arranged according to this invention as a first embodiment thereof.
Figure 2:
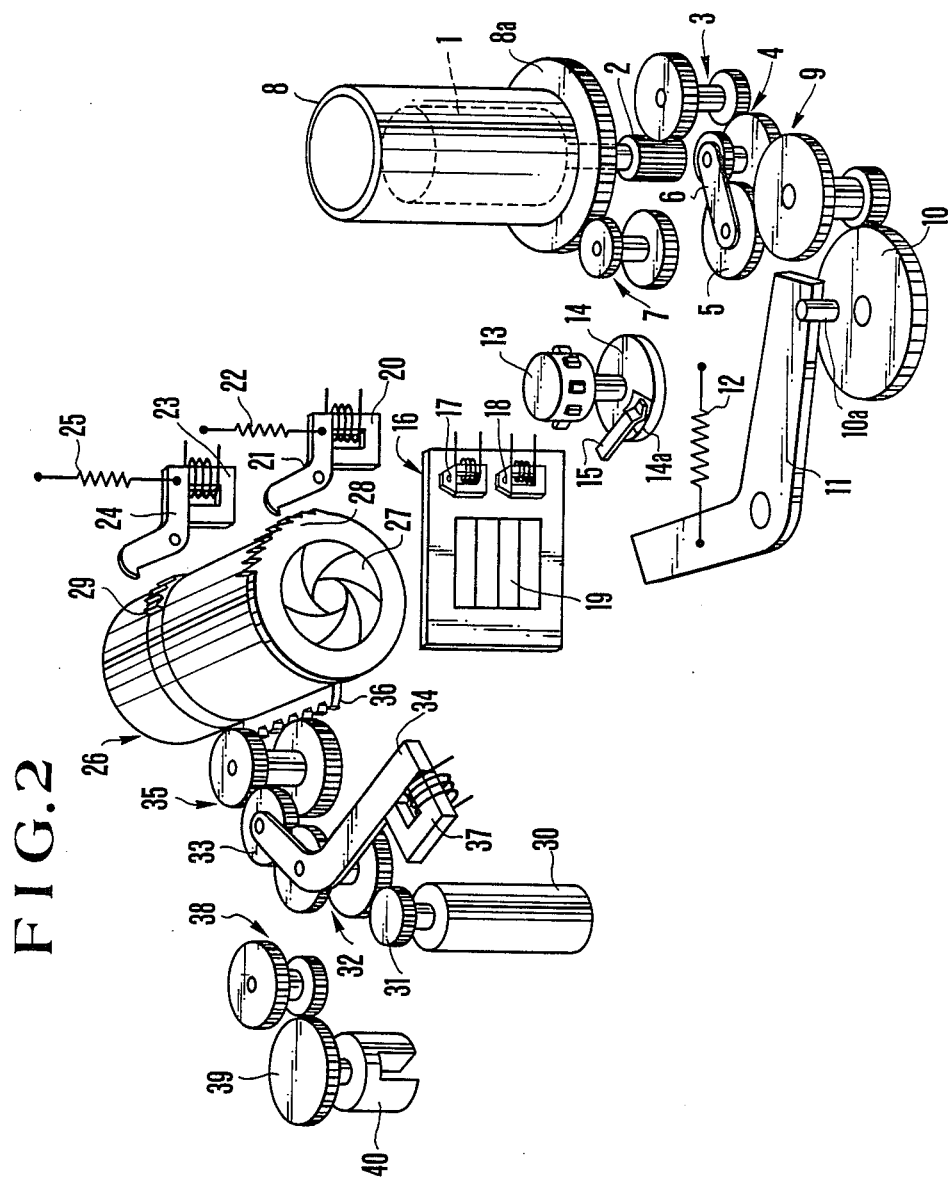
Figure 3:
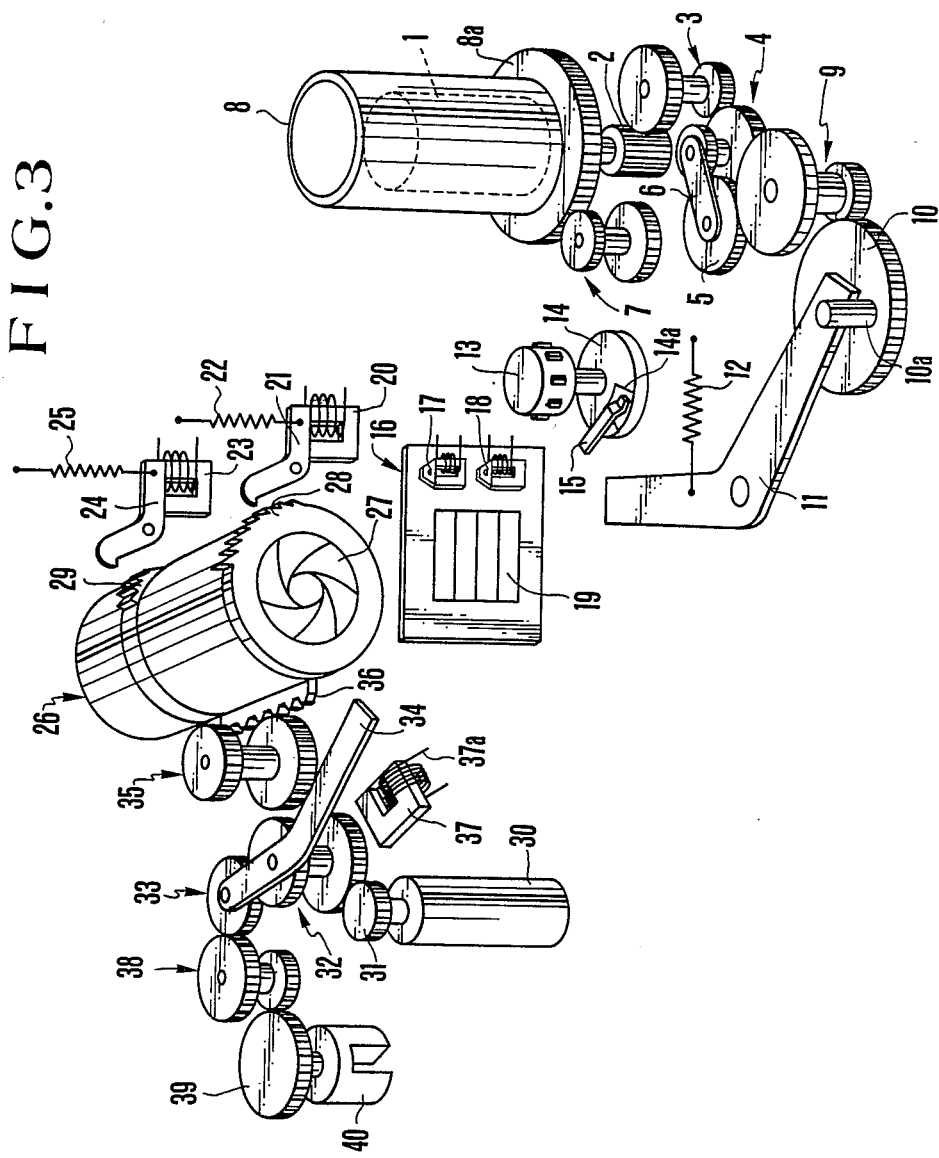

A first embodiment of this invention is arranged as described below with reference to FIGS. 1 to 5:

Referring to FIGS. 1, 2 and 3, a first motor 1 is disposed within a film take-up spool 8. A pinion 2 is secured to the output shaft of the motor 1. A double gear 3 consists of an upper gear 3a which engages the pinion 2 and a lower gear 3b which engages the lower gear 4b of another double gear 4. A planet gear 5 is arranged to engage the upper gear 4a of the double gear 4 and pivotally carried by an arm 6 to be revolvable round the gear 4a which serves as a sun gear. The planet gear 5 is thus arranged to selectively engage the lower gear 7b of a double gear 7 or the upper gear 9a of another double gear 9. The upper gear 7a of the double gear 7 engages the lower gear 8a of the take-up spool 8. The double gear 9 has its lower gear 9b engage a charge 10. A charge lever 11 is urged to turn clockwise by a spring 12 and is pivotally carried. One end of the charge lever 11 abuts on a charge pin 10a which protrude above the charge gear 10. A sprocket 13 is rotatably arranged in engagement with the perforation provided in a film. When the film is moved to an extent of one frame portion thereof, the sprocket makes one turn. A film detecting disc 14 which is provided with an electric conductor pattern part 14a is disposed beneath the rotation shaft of the sprocket 13. A film detecting switch 15 is arranged to turn on when it comes into contact with the conductor pattern part 14a. A shutter device 16 is provided with shutter blades 19, which are arranged to be opened and closed by the operations of a leading shutter curtain controlling magnet 17 and a trailing shutter curtain controlling magnet 18. These magnets are of the holding type. Another holding type magnet 20 is provided for controlling an iris diaphragm. When no power supply is effected, the magent 20 holds a diaphragm control pawl 21 against the force of a spring 22 which urges the pawl 21 to turn counterclockwise. A holding type magnet 23 which is provided for controlling an automatic focusing operation is arranged to hold, when receiving no power supply, an automatic focusing control pawl 24 against the force of a counterclockwise urging spring 25. A lens barrel 26 is provided with the iris diaphragm 27 and a diaphragm ring which is interlocked with the diaphragm 27. With the diaphragm control pawl 21 engaging the claw part 28 of the ring, the diaphragm is controlled to a desired aperture value. An automatic focusing claw part 29 of a focusing ring is arranged in association with an automatic focusing device. Focusing control is performed with the automatic focusing control pawl 24 engaging the claw part 29. A second motor 30 has a pinion 31 secured to its output shaft. A double gear 32 has the lower gear 32b engaged with the pinion 31. A planet gear 33 is pivotally carried by an arm 34 and is arranged to engage the upper gear 32a of the double gear 32 and to revolve round the gear 32a which serves as a sun gear. The planet gear 33 is thus arranged to selectively come to engage the upper gear 35a of a double gear 35 and the upper gear 38a of a double gear 38. A rack 36 which is interlocked with a zoom device (not shown) disposed within the lens barrel 26 engages the lower gear 35b of the double gear 35. A holding type magnet 37 is provided with a coil 37a which serves as a blocking member. When the magnet 37 is not energized, the arm 34 is attracted and held by the magnet 37. This prevents the planet gear 33 from revolving and keeps it engaged with the upper gear 35a of the double gear 35. The double gear 38 has its lower gear 38b engaged with a rewinding gear 39 which is arranged to turn together with a rewinding fork 40.

Figure 4:
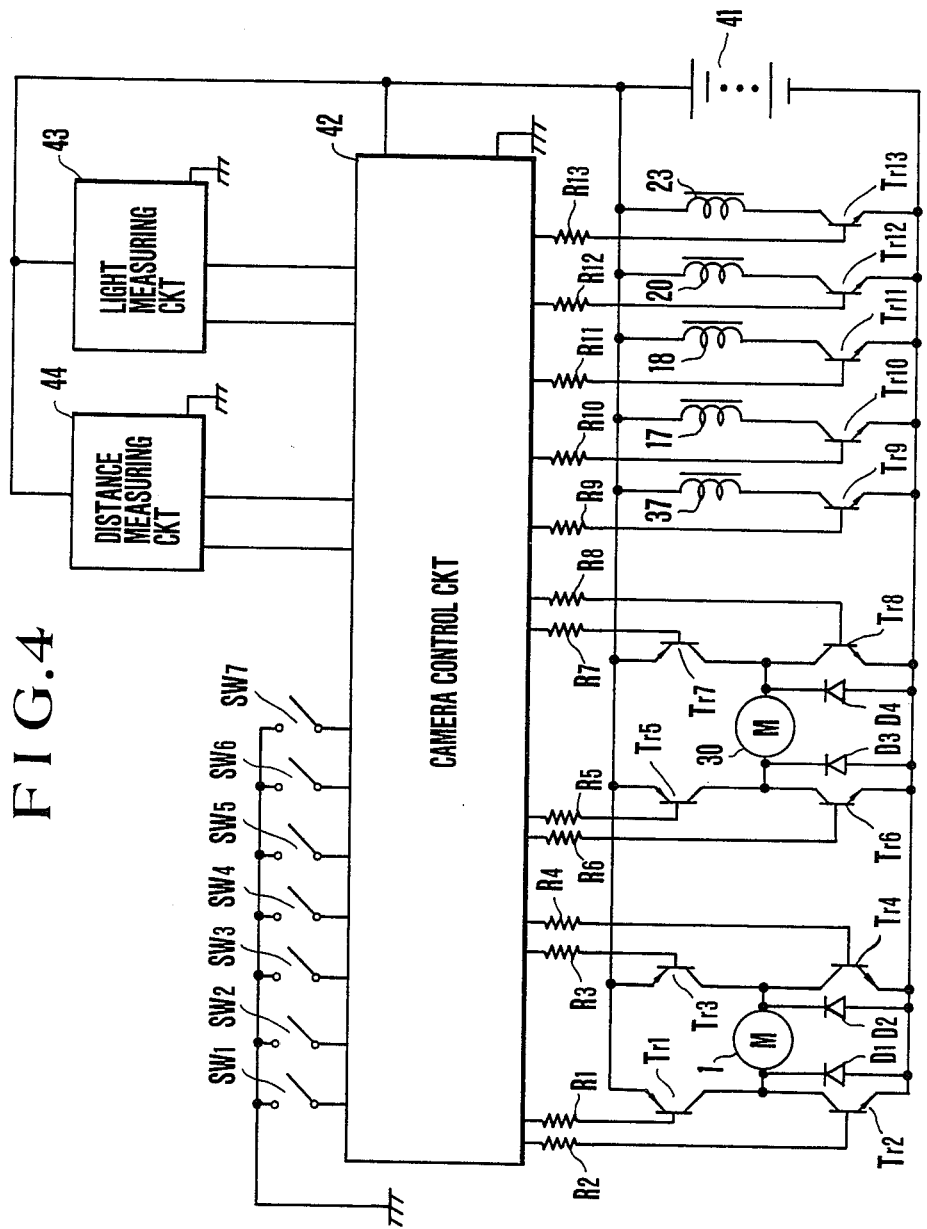
FIG. 4 is a circuit block diagram showing the first embodiment of this invention.
Figure 5:
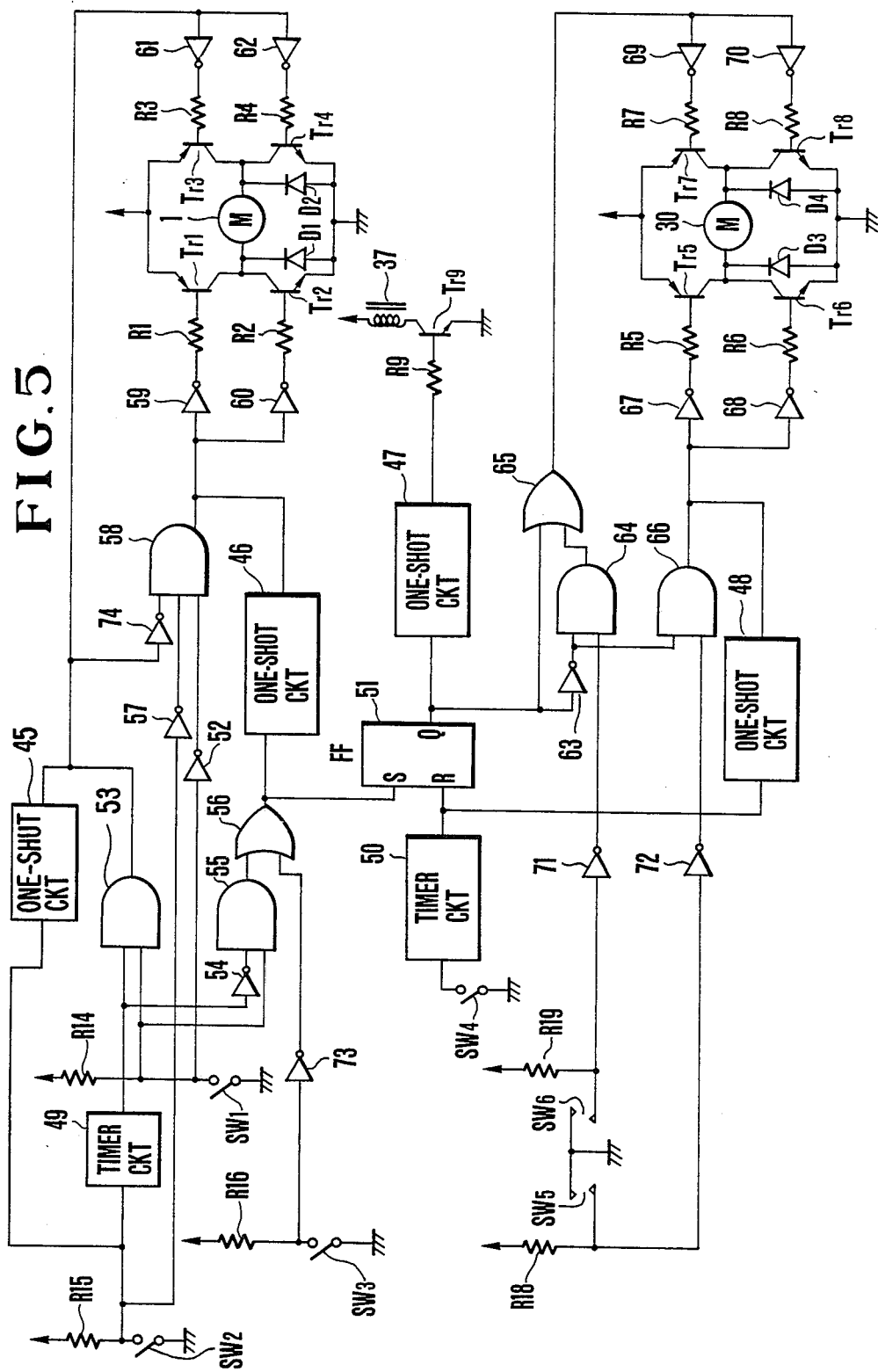
FIG. 5 is a circuit diagram showing a motor driving circuit and an electromagnetic means driving circuit included in FIG. 4.

FIGS. 4 and 5 show electric circuit arrangement for operating the camera which is arranged as described above. A power source 41 is connected to a camera control circuit 42, a light measuring circuit 43 and a distance measuring circuit 44 respectively. The outputs of the light and distance measuring circuits 43 and 44 are arranged to be supplied to the camera control circuit 42. The power source 41 is also connected to circuit elements including: A bridge circuit consisting of transistors Tr1, Tr2, Tr3 and Tr4 which are arranged for the first motor 1; a bridge circuit consisting of transistors Tr5, Tr6, Tr7 and Tr8 which are arranged for the second motor 30; and series connected pairs including the coil 37a of the holding type magnet 37 and a transistor Tr9, the holding type magnet 17 for leading shutter curtain control and a transistor Tr10, the magnet 18 for controlling trailing shutter curtain and a transistor Tr11, the holding type magnet for diaphragm apeature control and a transistor Tr12 and the holding type magnet 23 for focusing control and a transistor Tr13. The bases of the transistors Tr1 to Tr13 are connected via resistors R1 to R13 to the camera control circuit 42 respectively. Further, to the camera control circuit 42 are also connected the following elements: A switch SW1 which serves as the film detecting switch 15; a switch SW2 which is arranged to turn off upon completion of a charging process after completion of the travel of the trailing shutter curtain; a switch SW3 for start of rewinding; a film movement switch SW4 which turns on and off in association with the movement of the film; a telephoto side zoom switch SW5; a wide angle side zoom switch SW6; and a release switch SW7.

FIG. 5 shows a motor driving circuit and an electromagnetic means driving circuit which are included in the camera control circuit 42 shown in FIG. 4. Referring to FIG. 5, the switch SW1 is connected to the power source via a resistor R14, to one input terminal of an AND gate 53, to one input terminal of an AND gate 55 and also to one input terminal of another AND gate 58 via an inverter 52 respectively. The switch SW1 thus produces an off signal at a high level to the AND gates. The switch SW2 is connected via a resistor R15 to the power source, to a one-shot circuit 45, to a timer circuit 49 and to the other input terminal of the above-stated AND gate 58 via an inverter 57 respectively. The output terminal of the one-shot circuit 45 is connected to the base of the transistor Tr3 via an inverter 61 and a resistor R3 and also to the base of the transistor Tr4 via an inverter 62 and a resistor R4. The output terminal of the timer circuit 49 is connected to the other input terminal of the AND gate 53 and also to the other input terminal of the AND gate 55 via an inverter 54. The output terminal of the AND gate 53 is connected to the output terminal of the one-shot circuit 45 and also to the AND gate 58 via an inverter 74. The output terminal of the AND gate 55 is connected to one of the input terminals of an OR gate 56. The output terminal of the OR gate 56 is connected to an inverter 59 via a one-shot circuit 46 together with the output terminal of the AND gate 58, to the base of the transistor Tr1 via a resistor R1 and also to the base of the transistor Tr2 via an inverter 60 and a resistor R2. The switch SW3 is connected via a resistor R16 to the power source and to the other input terminal of the OR gate 56 via an inverter 73. The output terminal of the OR gate 56 is connected to the input terminal S of flip-flop 51.

The output terminal Q of the flip-flop 51 is connected to a one-shot circuit 47, to one of the input terminals of an AND gate 64 via an inverter 63, to one of the input terminals of an AND gate 66 and also to one of the input terminals of an OR gate 65. The output terminal of the one-shot circuit 47 is connected via a resistor R9 to the base of the transistor Tr9. The output terminal of the AND gate 64 is connected to the other input terminal of the OR gate 65. The switch SW4 is connected to the timer circuit 50. The output terminal of the timer circuit 50 is connected to the input terminal R of the flip-flop 51 and also to the output terminal of an AND gate 66 via a one-shot circuit 48.

The telephoto side zoom switch SW5 is connected via a resistor R18 to the power source and also to the other input terminal of the AND gate 66 via an inverter 72. The wide angle side zoom switch SW6 is connected via a resistor R19 to the power source and also to the other input terminal of the AND gate 64 via an inverter 71. The output terminal of the AND gate 66 is connected to the base of the transistor Tr5 via an inverter 67 and a resistor R5 and also to the base of the transistor Tr6 via an inverter 68 and a resistor R6 respectively.

The output terminal of the OR gate 65 is connected to the base of the transistor Tr7 via an inverter 69 and a resistor R7 and also to the base of the transistor Tr8 via an inverter 70 and a resistor R8 respectively.

Diodes D1 and D2 are respectively connected between the negative pole of the power source 41 and both poles of the motor 1. Diodes D3 and D4 are respectively connected between the negative pole of the power source 41 and both poles of the motor 30. The operation of this embodiment is as described below:

Referring to FIG. 1, the rewinding fork 40 is loaded with a film cartridge which is not shown. The leader portion of the film is attached to the spool 8. The back lid of the camera is closed. Preparation for photographing is made by feeding the film in a blank state to a predetermined extent by means of the motor 1 through the pinion 2 and the gears 3, 4, 5, 7 and 8a.

When the release switch SW7 is turned on by a release operation, the light measuring circuit 43 and the distance measuring circuit 44 turn on and the camera is actuated. An automatic focusing process and an aperture control process begin. The output of the distance measuring circuit 44 causes the automatic focusing control magnet 23 of the holding type to receive a power supply. The urging force of the spring 25 causes the focusing control pawl 24 to turn counterclockwise. With the pawl 24 thus coming to engage the automatic focusing claw part 29, the automatic focusing process comes to an end. At the same time, with an aperture value which is determined by the output of the light measuring circuit 43 obtained, the aperture controlling holding type magnet 20 receives a power supply. The urging force of the spring 22 then causes the diaphragm control pawl 21 to turn counterclockwise to engage the claw part 28 of the diaphragm ring and an aperture control operation is performed.

Upon completion of the automatic focusing and the aperture control, the holding type magnet 17 for leading shutter curtain control receives a power supply. The leading shutter curtain begins to travel. After the lapse of a given length of exposure time, the holding type magnet 18 for trailing shutter curtain control receives a power supply to allow the trailing shutter curtain to begin to travel. The film is exposed to light. Upon completion of the travel of the trailing shutter curtain, the switch SW2 turns on. With the switch SW2 turned on, the one-shot circuit 45 turns on to produce a high level output. This high level output causes the transistor Tr3 to turn on via the inverter 61. At this point of time, although the switch SW1 is on, a low level output thereof is supplied via the inverter 74 to the AND gate 58. Therefore, the output level of the AND gate 58 becomes low. This causes the transistor Tr2 to turn on. As a result, a current flows forward, i.e. transistor Tr3→motor 1→transistor Tr2. The motor 1 then rotates forward (clockwise as viewed on FIG. 1) for a predetermined period of time. This causes via the pinion 2 and the gears 3 and 4, the planet gear 5 to engage the lower gear 7b of the double gear 7 and thus to transmit the driving force of the motor 1 to the spool 8. The spool 8 then takes up the film. When the film is taken up, the sprocket 13 is rotated by the film. The electrical continuity between the conductive pattern part 14a of the film detecting disc 14 and the film detecting switch 15 is cut off. The switch SW1 turns off. The output of the one-shot circuit 45 is arranged to be at a high level for a period of time between the start of rotation of the motor 1 and turning off of the switch SW1.

The timer circuit 49 turns on when the switch SW2 turns on. The time counting time of the timer circuit 49 is arranged to be a little longer than a length of time normally required for film winding. Therefore, even if there is no output of the one-shot circuit 45, the high level output of the timer circuit 49 and turning off of the switch SW1 while the sprocket 13 is rotating cause the AND gate 53 to produce a high level output to allow the motor 1 to keep on rotating forward. Upon completion of feeding one frame portion of the film, the switch SW1 again comes to turn on. This causes the output level of the AND gate 53 to become low. The transistor Tr3 turns off and the transistor Tr4 turns on. Then, the short-circuit of the motor 1, the transistor Tr4 and the diode D1 brings the motor 1 to a stop.

When the switch SW1 turns on with a film winding process having come to an end as mentioned above, a high level signal comes via the inverter 52 to the AND gate 58. Further, since the output level of the AND gate 53 then becomes low, a high level output thereof is supplied via the inverter 74 to the AND gate 58. At that time, since the switch SW2 is in an on-state, the output level of the AND gate 58 becomes high to turn on the transistor Tr1 via the inverter 59. Then, since the transistor Tr4 is in an on-state, a current flows to the motor 1 in the reverse direction. The motor 1 therefore rotates backward. The backward or reverse rotation of the motor 1 causes the planet gear 5 to revolve round the upper gear 4a of the double gear 4 and to come to engage the upper gear 9a of the double gear 9. The driving force of the motor 1 is thus transmitted to the charge gear 10 via the pinion 2, the gears 3, 4 and 5 and the double gear 9. The charge pin 10a of the charge gear 10 then causes the charge lever 11 to turn round against the force of the spring 12. The charge lever 11 thus charges, via an interlocking arrangement which is not shown, all the camera mechanisms including the automatic focusing device, the diaphragm device, the shutter device, etc. with the exception of the film feeding device. By this, the magnets 17, 18, 20 and 23 are set in their attracting and holding states. The charging process comes to an end with the charge gear 10 having made one turn. Upon completion of charging, the switch SW2 turns off. Then, a low level signal is supplied via the inverter 57 to the AND gate 58. The output level of the AND gate 58 becomes low. Therefore, the transistor Tr1 is caused to turn off via the inverter 59. The transistor Tr2 is turned on via the inverter 60. As a result, the short circuit consisting of the motor 1, the transistor Tr2 and the diode D2 brings the motor 1 to a stop. Thus, the film feeding and camera charging processes are completed. If the shutter release button of the camera is continuously pushed down, these processes are repeatedly carried on for continuous photographing.

In case that the telephoto side zoom switch SW5 is turned on in this instance, the two inputs of the AND gate 66 become high levels. The output level of the AND gate 66 becomes high. The high level output of the AND gate 66 turns on the transistor Tr5 via the inverter 67. Meanwhile, since the OR gate 65 is producing a low level output then, the transistor Tr8 is caused to turn on via the inverter 70. A current then flows in such a manner as power source 41→transistor Tr5→motor 30→transistor Tr8. This current flow causes the motor 30 to rotate forward.

Under a normal photographing condition which is as shown in FIG. 1, the arm 34 is attracted and held by the holding type magnet 37. Therefore, the planet gear 33 is in a state of engaging the upper gear 35a of the double gear 35. When the motor 30 rotates forward, the driving force of the motor is transmitted via the pinion 31 and the gears 32, 33 and 35, to the rack 36 which is interlocked with a zoom device. A zooming operation is then performed on the lens of the camera to shift its position to the telephoto side thereof. When the switch SW5 is turned off, the AND gate 66 produces a low level output. The transistor Tr5 turns off, the transistor Tr6 turns on. The short circuit consisting of the motor 30, the transistor Tr6 and the diode D4 then brings the motor 30 to a stop.

When the wide angle side zoom switch SW6 is turned on, the output level of the AND gate 64 becomes high. The output level of the OR gate 65 also becomes high. Further, the output of the AND gate 66 is at a low level. The transistors Tr7 and Tr6 turn on. The motor 30 reversely rotates. The driving force of the motor 30 is transmitted to the rack 36. A zooming operation is then performed to shift the lens position to the wide angle side thereof. The camera is thus arranged to be capable of performing a zooming operation called power zooming with the zoom switch SW5 or SW6 turned on and off. The zooming operation can be performed independently of the film winding and camera charging operations mentioned in the foregoing. An angle of view can be determined by the zooming operation during the process of film winding before a shutter releasing operation. The arrangement of the embodiment also permits without difficulty a special photographing operation by carrying out a zooming operation during the shutter opening process in such a manner as to have an image shift toward the center of the picture.

Upon completion of photographing operations on all the frame portions of the film, the switch SW2 turns on and a film winding process begins. However, in that event, the switch SW1 never comes to turn on. Therefore, after the lapse of a length of time counted by the timer circuit 49, the output level of the AND gate 53 becomes low. The transistor Tr3 turns off. The transistor Tr4 turns on. The motor 1 comes to a stop. At the same time, the output level of the AND gate 55 becomes high. The output level of the OR gate 56 also becomes high. One-shot circuit 46 then comes to momentarily turn on to cause the transistors Tr1 and Tr4 to turn on. This causes the motor 1 to reversely rotate only for a predetermined period of time. Then, as shown in FIG. 3, the planet gear 5 revolves to come away from the lower gear 7b of the double gear 7. As a result, the transmission of the driving force of the motor 1 to the spool 8 is cut off.

The filp-flop 51 is set by the high level output of the OR gate 56. The output level of the flip-flop 51 becomes high. The one-shot circuit 47 turns on and stays in the on-state only for a predetermined period of time. This causes the transistor Tr9 to turn on to effect a power supply to the coil 37a of the holding type magnet 37. The magnet 37 is reversely excited. Concurrently with that, the output level of the OR gate 65 becomes high. Since the output of the AND gate 66 is at a low level, the transistors Tr6 and Tr7 turn on to cause the motor 30 to reversely rotate.

As a result, the holding force on the arm 34 of the magnet 37 is nullified. Then, since the motor 30 is reversely rotating, the planet gear 33 revolves counterclockwise to come to engage the upper gear 38a of the double gear 38. The driving force of the motor 30 is transmitted via the rewinding gear 39 to the rewinding fork 40. The film is rewound. In this instance, as mentioned above, the spool 8 is detached from the transmission system of the motor 1. Therefore, a rewinding load includes only the film load, so that rewinding can be performed without any unnecessary load.

This rewinding operation causes the film movement switch SW4 to repeatedly turn on and off. Accordingly, the timer circuit 50 is also repeatedly reset. When the switch SW4 comes to no longer turn on and off with the film rewinding operation coming to an end, the flip-flop 51 is reset by the output of the timer circuit 50. The output level of the OR gate 65 becomes low. The transistor Tr7 turns off. The transistor Tr8 turns on. The motor 30 comes to stop rotating. At the same time, the one-shot circuit 48 turns on to turn on the transistor Tr5. The motor 30 is caused to rotate forward only for a predetermined period of time. The planet gear 33 revolves clockwise until it comes to engage the upper gear 35a of the double gear 35. The transistor Tr9 turns off and the magnet 37 is not energized. Therefore, the arm 34 is held by the magnet 37. During the process of film rewinding, a signal produced from the inverter 63 makes the output levels of the AND gates 64 and 66 low irrespectively of the operation of the zoom switch SW5 or SW6. Therefore, any operation on the zoom switches SW5 and SW6 receives no response while film rewinding is in process. Further, in the event of rewinding a film which has not yet come to its end, the output level of the OR gate 56 also becomes high in the same manner as described above when the rewinding start switch SW3 is turned on. The film thus can be rewound. Upon completion of rewinding, since the motor 30 is automatically connected to the zoom driving system, film rewinding thus can be accomplished without being affected by the zoom switches SW5 and SW6.

Figure 6:
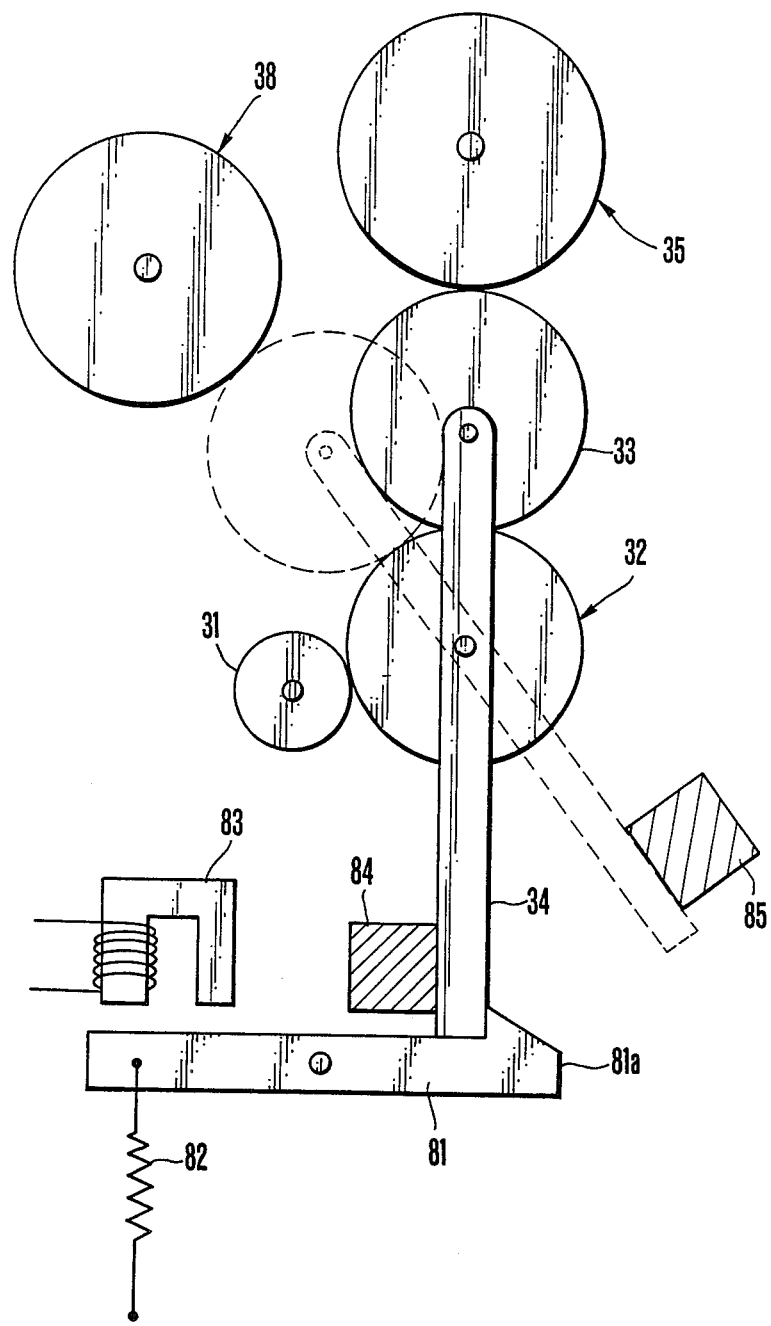
FIG. 6 is a schematic illustration showing the arrangement of a transmission system change-over device arranged as a second embodiment of this invention.

In a second embodiment of this invention, the essential parts of a device for change-over between the zooming operation and the film rewinding operation are arranged as shown in FIG. 6. Referring to FIG. 6, in the first embodiment described, the arm 34 carrying the planet gear 33 is arranged to be attracted and directly held by the permanent magnet 37. Whereas, in the second embodiment, the arm 34 is arranged to be held by a lock lever. The parts which are the same as those of the first embodiment are indicated by the same reference numerals and are omitted from the following description, which is limited to points in which the second embodiment differs from the first:

A lock lever 81 is urged by a spring 82 to turn counterclockwise. The planet gear 33 is carried by an arm 34. The lock lever 81 is arranged to lock and hold the arm 34 in a position where the planet gear 35 engages the double gear 35 which is interlocked with a zooming device. When a suction type magnet 83 is energized, the lock lever 81 is attracted by the magnet 83 against the force of the spring 82. The arm 34 is then unlocked by this. This allows the planet gear 33 to revolve until it comes to engage the double gear 38 which is interlocked with the rewinding system. The second embodiment includes a stopper 84 which defines the zoom driving position of the arm 34; and another stopper which defines the rewinding driving position of the arm 34. Accordingly, in case that the planet gear 33 is coupled with the zoom driving system, the arm 34 is fixed on both sides thereof by the stopper 84 and the lock lever 81. This arrangement ensures that the revolving force can be obtained without fail by the forward or reverse rotation of the motor or when the zooming operation is performed to the end of the telephoto side or that of the wide angle side by a zoom driving force. Further, in carrying out film rewinding, when the suction type magnet 83 is energized, the lock lever 81 is attracted by the magnet 83 to disengage the arm 34. This allows the planet gear 33 to revolve to come to engage the double gear 38, so that the film can be rewound.

In case where two motors are used as in the case of the above-stated embodiment, the transmission efficiency of the gear train can be enhanced by having a part to be driven located closed to each of the motors with these motors arranged on two sides of an optical axis to take up the film by the motor disposed on the side of the spool and to perform zoom driving and film rewinding by the other motor disposed on the side of the rewinding fork.

In the case of the second embodiment, one of the parts to be driven is arranged to be driven in the forward and reverse directions while the other is arranged to be driven only in one direction. However, both of the parts to be driven may be arranged to be drivable in the forward and reverse directions by providing some means for blocking planet gear revolution for both of them.

As described in the foregoing, in the first and second embodiments, with the planet gear device employed in the motor drive system, forward and backward or reverse driving operations can be performed by means of revolution blocking means; and change-over from one transmission system to the other is effected by releasing the revolving movement of the planet gear from blocking means. Therefore, with a single motor used, the invented arrangement not only permits forward and backward driving operations but also permits change-over between different transmission systems to drive each of them independently of the other. Besides, the change-over can be simply carried out by switch means without recourse to a manual operation. This not only greatly improves the operability of the camera but also permits automatic change-over in combination with an electric circuit. Further advantages includes that the invented arrangement permits effective utilization of the limited space of a camera and reduction in cost.

Figure 7:
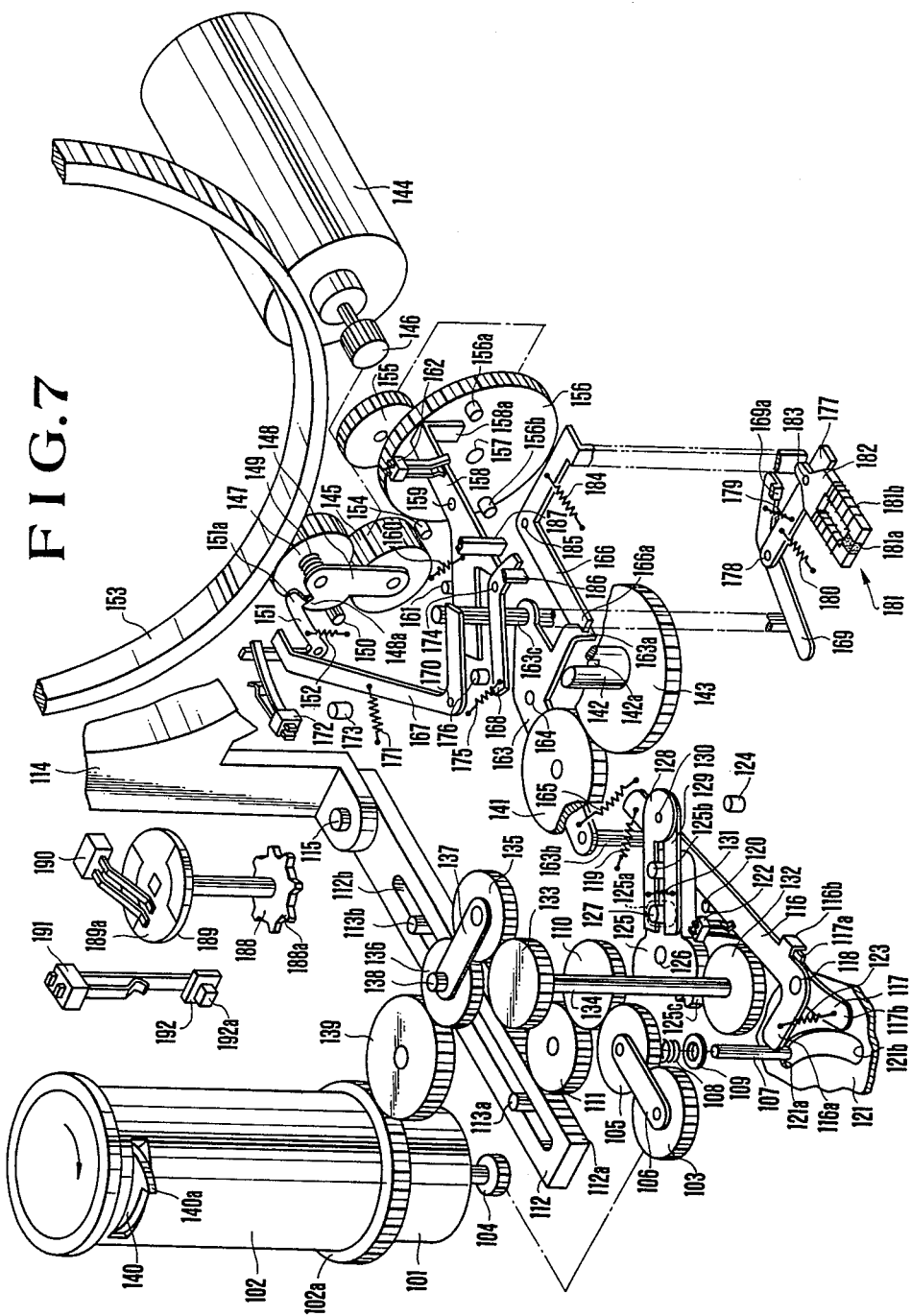
FIGS. 7, 8 and 9 are oblique views showing the operation of a motor operated camera arranged as a third embodiment of this invention.
Figure 8:
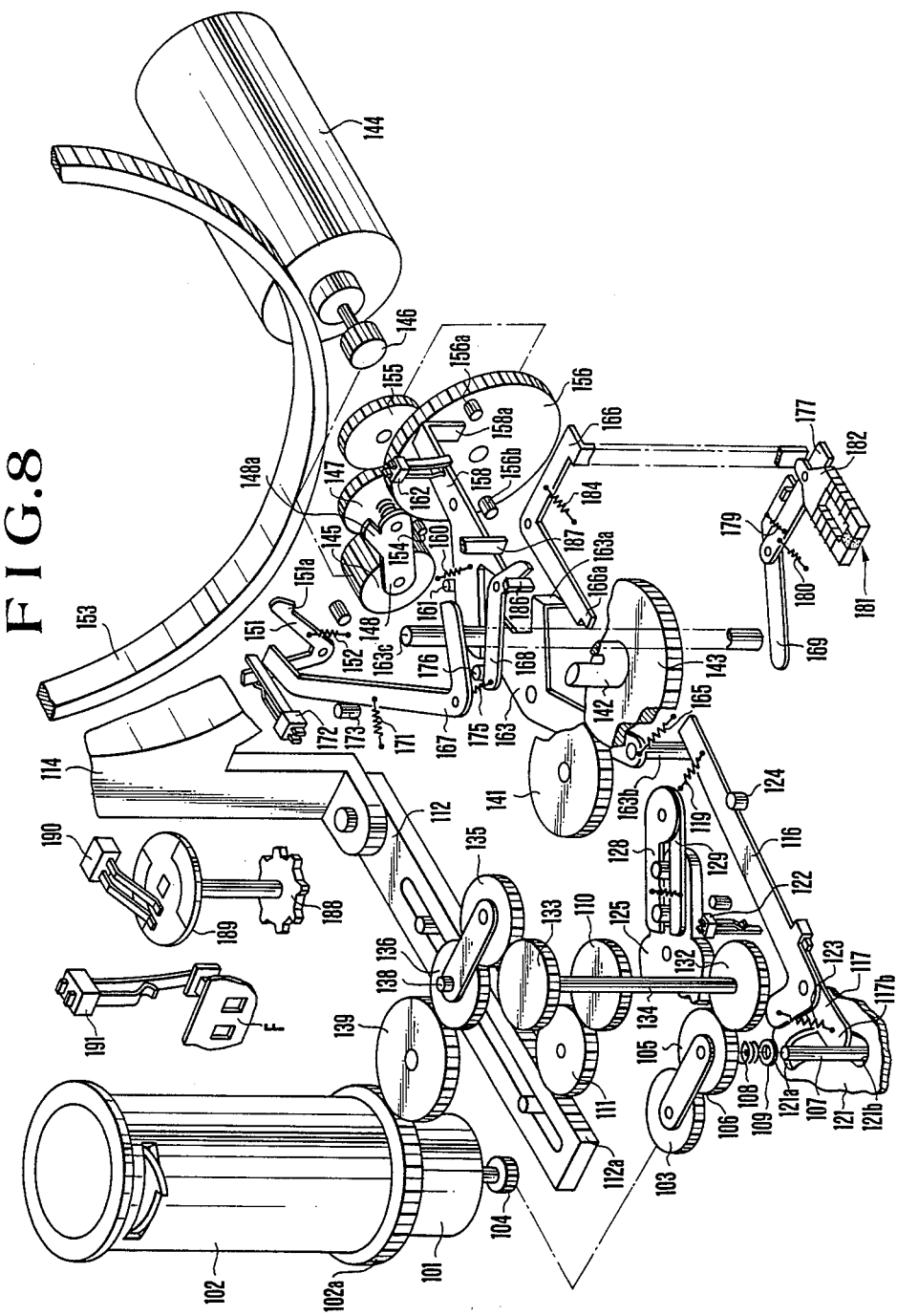
Figure 9:
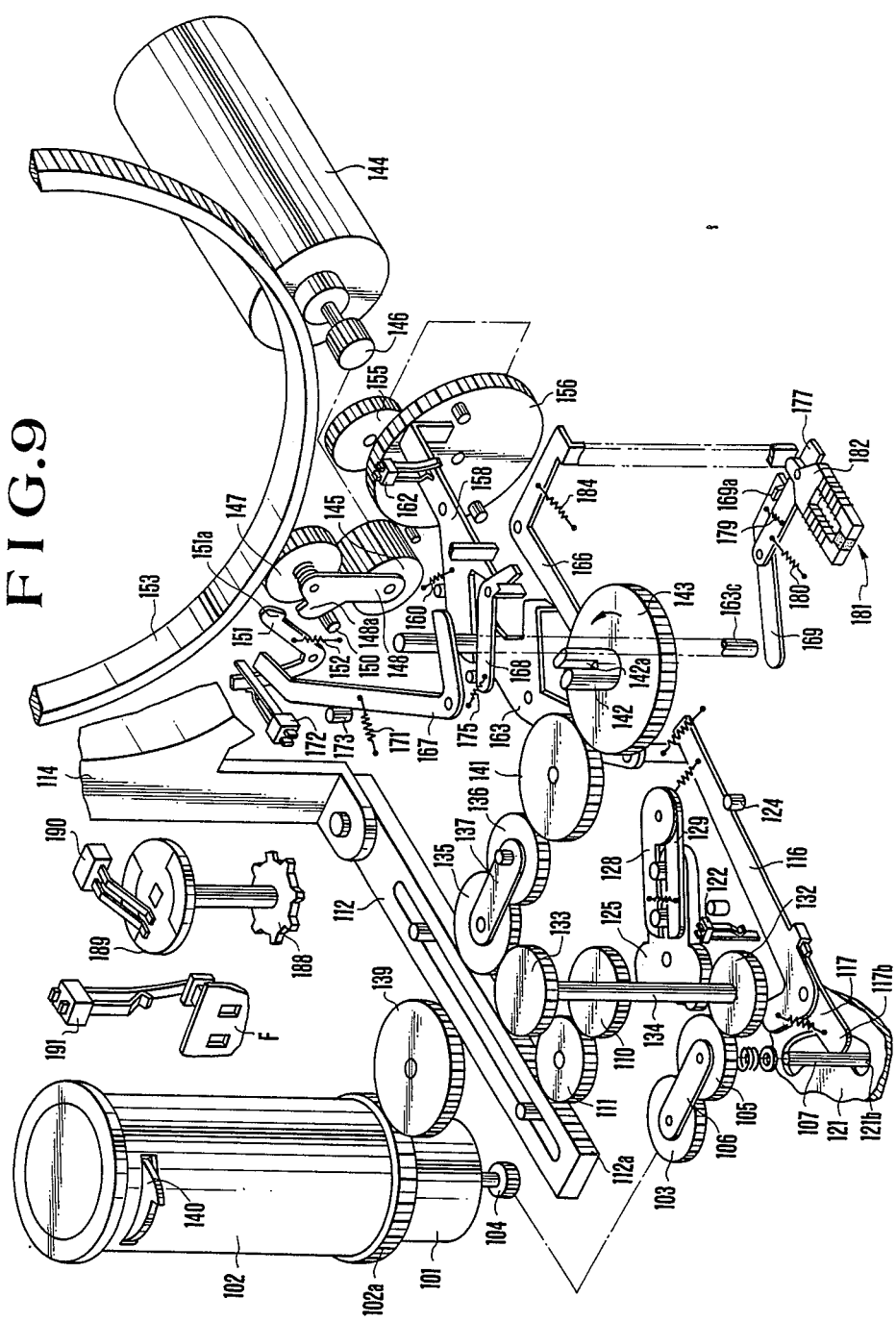

FIGS. 7 to 11 show a third embodiment of this invention. The mechanical arrangement of the third embodiment is as shown in FIGS. 7, 8 and 9. A motor 101 is secured to a camera body which is not shown and is disposed within the hollow inside of a spool 102. A gear 104 which is arranged to transmit the driving force of the motor 101 to a sun gear 103 via a reduction gear train (not shown) is pressure fitted (or cemented) onto the fore end of the rotation shaft of the motor. A planet gear 105 is carried by an arm 106 and is arranged to be revolvable around the sun gear 103. A stopper 107 is arranged in one unified body with the rotation shaft of the planet gear 105 to revolve together with the planet gear. A spring 108 is arranged between the planet gear and a spring retainer 109 to generate a suitable degree of frictional torque for preventing the planet gear 105 from rotating and for imparting a revolving force to the gear 105. A gear 110 is arranged to transmit the output of the planet gear 105 via a gear 111 to the rack part 112a of a sliding lever 112. With the output of the planet gear 105 transmitted, the sliding lever 112 makes a linear motion by virtue of its guide slot 112b and guide pins 113a and 113b in the direction of a photo-taking optical axis. A zoom driving member 114 is secured by means of a mounting member 115 to the sliding lever 112 and is arranged to shift a zooming lens group which is not shown in the direction of the photo-taking optical axis.

Clutch levers 116 and 117 are arranged to be turnable on a shaft 118. A spring 119 urges the clutch lever 116 to turn counterclockwise. The counterclockwise turn of the lever 116 is restricted by a stopper 120. Under that condition, the stopper part 116a of the lever 116 comes into the revolving locus of the stopper 107 to prevent thereby the planet gear 105 from being caused to revolve by the clockwise rotation of the sun gear 103. This stopper part 116a is preferably formed in an approximate arcuate shape on the shaft 118. A stopper member 121 is provided with stopper parts 121a and 121b which are formed at two ends of a slot and are arranged to restrict the clockwise or counterclockwise revolution of the above-stated stopper 107. A switch 122 is arranged to be in an off state when the clutch lever 116 is abutting on the stopper 120, as shown in FIG. 7 and to turn on when the lever 116 moves clockwise from the abutting position, as shown in FIGS. 8 and 9. The other clutch lever 117 is urged by a spring 123 disposed in between the clutch levers 116 and 117 to turn clockwise and has its position restricted between restricting members 116b and 117a. In case that the clutch lever 116 is within the revolving locus of the stopper 107, the stopper part 117b of the lever 117 stays outside of the revolving locus of the stopper 107 (see FIG. 7). A stopper 124 is arranged to restrict the clockwise movement of the clutch lever 116. When the clutch lever 116 is in this restricted position, the stopper part 116a of the lever 116 is outside of the revolving locus of the stopper 107 while the stopper part 117b of the lever 117 is within the revolving locus of the stopper 107 (see FIGS. 8 and 9). An internal gear 125 is arranged to be turnable on a shaft 126 and has its movement restricted between a stopper slit 125a and a stopper 127. Restriction levers 128 and 129 are arranged to be turnable on a shaft 130 and are set by the urging force of a spring 131 in positions to have the above-stated stopper 127 in between them. The above-stated internal gear 125 is provided with a projection 125b which is likewise placed in between the restriction levers 128 and 129. Therefore, the internal gear 125 is positioned at a middle point of the turnable range thereof. The internal gear is thus swingably carried for the following reason: In the event of occurrence of inadequate engagement between the toothed part of the planet gear 105 and the internal gear 125 during the revolution of the planet gear 105, biting can be prevented from occurring to ensure adequate engagement by allowing the internal gear 125 to move away from the planet gear. The internal gear 125 which is provided with the toothed part 125c is disposed within the revolving locus of the planet gear 105, because: At the beginning of the revolution of the planet gear, the clutch lever 116 moves away from the revolving locus of the stopper 107. At that time, however, the other clutch lever 117 is within the revolving locus. Therefore, the stopper 107 must have a sufficient revolving force for turning round the clutch lever 117 counterclockwise. The arrangement of the gear 125 ensures this required revolving force. In this specific embodiment, the sufficient degree of revolving force is thus ensured by means of the internal gear 125, etc. However, this purpose may be also attained by using a simple protrudent member instead of the internal gear or by utilizing friction.

A gear 132 is arranged to engage the planet gear 105 when the position of the stopper 107 is restricted by the stopper parts 117b and 121b (see FIGS. 8 and 9). A gear 133 is formed in one unified body with the gear 132 and a transmission shaft 134. The output of the gear 133 is thus arranged to be transmitted to a sun gear 135. A planet gear 136 is carried by an arm 137 to be revolvable round the sun gear 135. The revolving force of the planet gear 136 is arranged to be obtained from a source which is similar to the above-stated spring 108 and the spring retainer 109.

When the sun gear 135 rotates counterclockwise, the planet gear 136 revolves counterclockwise until a stopper 138 comes to abut on a fixed stopper which is not shown. The planet gear 136 engages a gear 139 under this condition. The output of the gear 139 is transmitted to the gear part 102a of the spool 102 to cause the spool 102 to rotate clockwise. The spool thus takes up the film F (see FIGS. 8 and 9). A claw 140 is pushed to the outside of the spool 102 by a spring to a sufficient extent for the purpose of facilitating engagement with the perforation of the film in loading the camera with the film. With the perforation of the film engaged with the engaging part 140a of the claw 140, the claw is turned round counterclockwise by the tension of the film against the force of the spring which is not shown. The engaging part alone then remains protrudent from the outside of the spool 102. Under this condition, the engaging part 140a serves as a stopper by engaging with the film perforation.

When the sun gear 135 rotates clockwise, the planet gear 136 also revolves clockwise until the stopper 138 comes to abut on a stopper which is not shown. Under that condition, the planet gear 136 engages a gear 141. A rewinding member 142 is provided with an engaging slit 142a which is arranged to have the take-up shaft of a film cartridge (not shown) fitted thereon. The output of the gear 141 is arranged to be transmitted to the gear 143 which is arranged in one unified body with the rewinding member 142. Then, the film cartridge which is not shown rotates counterclockwise to rewind the film F.

A motor 144 is arranged in parallel with the optical axis of a photo-taking lens. The fore end of the rotation shaft of the motor 144 is either fitted in or cemented to a gear 146 which is arranged to transmit the output of the motor 144 to a sun gear 145 via a reduction gear train which is not shown. A planet gear 147 is carried by an arm 148 in such a way as to be capable of revolving round the sun gear 145. A spring 149 is arranged to generate a suitable degree of frictional torque for preventing the planet gear 147 from rotating by itself and for imparting a revolving force to the gear 147. When the arm 148 is abutting on a stopper 150, that is, when a clamp lever 151 is caused by the urging force of a spring 152 to turn clockwise to have its engaging part 151a engage the engaging part 148a of the arm 148 (see FIG. 7), the planet gear 147 engages a focus driving member 153 which is arranged to drive the photo-taking lens by means of a helicoid arrangement or the like which is not shown. With the output of the planet gear 147 (or the motor 144) transmitted to the focus driving member 153, the member 153 either turns forward or turns backward to shift the photo-taking lens either toward an infinity position or toward the nearest distance position thereof. In case that the sun gear 145 is rotated clockwise with the clamp lever 151 having been turned counterclockwise against the force of the spring 152, the planet gear 147 revolves until the arm 148 comes to abut on the stopper 154. In that position, the planet gear 147 engages a gear 155. The output of the gear 155 is transmitted via a reduction gear train which is not shown to a charge gear 156 which is provided with projections 156a and 156b. This causes the charge gear 156 to rotate clockwise on the shaft 157.

A charge lever 158 is pivotally carried by a shaft 159 to be turnable and is urged to turn clockwise by a spring 160. The initial position of the charge lever is determined by a stopper 161. When the above-stated charge gear 156 begins to rotate counterclockwise, the projection 156a (or 156b) comes to push the bent down part 158a of the charge lever 158. This causes the charge lever 158 to turn counterclockwise against the force of the spring 160. A switch 162 is in an off state while the charge lever 158 is abutting on the stopper 161 and turns on when the lever 158 turns counterclockwise. A charge or accumulating lever 163 is pivotally carried by a shaft 164 and is urged to turn counterclockwise by a spring 165. The urging force of the spring 165 is larger than that of the spring 119 which is urging the above-stated clutch lever 116 counterclockwise. Under a condition as represented by FIG. 7 where the engaging part 163a of the charge lever 163 is in engagement with the engaging part 166a of a clamp lever 166 against the force of the spring 165, i.e. when the counterclockwise turn of the charge lever 163 is blocked, the change-over part 163b of the lever 163 is out of contact with the clutch lever 116. The charge part 163c of the lever 163 is in contact with levers 167, 168 and 169. The lever 167 is pivotally carried by a shaft 170 and is urged by a spring 171 to turn counterclockwise. Since the position of the lever 163 is restricted at the charge part 163c under the condition of FIG. 7, the above-stated clamp lever 151, in this instance, turns clockwise according to the urging force of the spring 152. The clockwise turn of the clamp lever 151 comes to turn off a switch 172 which is arranged to detect the conditon of the clamp lever 151. When the position of the charge lever 167 is not restricted by the charge part 163c, the lever 167 is abutting on a stopper 173 (see FIGS. 8 and 9).

The urging force of the spring 171 is larger than that of the spring 152. The above-stated lever 168 is pivotally carried by a shaft 174. When the lever 168 is not under the positional restriction of the charge part 163c, the urging force of a spring 175 keeps the lever 168 in a state of abutting on a stopper 176. The above-stated lever 169 and another lever 177 are pivotally carried by a shaft 178. The lever 169 is urged to turn clockwise by a spring 179 interposed in between the levers 169 and 177. The lever 177 is urged also to turn clockwise by a spring 180. An electromagnet 181 consists of a permanent magnet 181a and a coil 181b. When a power supply to the electromagnet 181 is cut off, the magnet attracts an armature 182. When the power supply begins, the attracting force disappears as a magnetic flux flows in the direction opposite to the permanent magnet 181a. In other words, the electro-magnet 181 is demagnetized. To ensure stable attraction by the electromagnet 181, the armature 182 is pivotally carried by a swingable shaft 183 which is erected on the lever 177. The urging force of the spring 179 is arranged to be smaller than the attracting force on the armature 182 and is larger than the urging force of the spring 180. Therefore, when the electromagnet 181 is demagnetized, the lever 177 is allowed to turn round according to the urging force of the spring 179 and against that of the spring 180 until it comes to be restricted by the bent up part 169a of the lever 169. Then, the clamp lever 166 is pushed by the armature 182 to turn counterclockwise. The clamp lever 166, therefore, turns counterclockwise on the shaft 185 against the force of a spring 184 which has a smaller urging force than the pushing force (see FIGS. 8 and 9). The engaging part 166a of the clamp lever 166 is then disengaged from the engaging part 163a of the above-stated lever 163. With these engaging parts 166a and 163a disengaged, the charge or accumulation lever 163 turns round counterclockwise. As a result, the lever 168 which has been abutting on the engaging part 163c comes to turn clockwise according to the urging force of the spring 175. Then, a shutter double light-shield removing lever 186 comes to operate. A shutter which is not shown is assumed to be in the double light shielding type arranged to have the film frame to be exposed to light covered by both the leading and trailing curtains in the charge completed state thereof in this specific case. Therefore, the trailing shutter curtain must be once retracted from the exposing frame before an exposure. The above-stated shutter double light-shield removing lever 186 is provided for that purpose. With the above-stated lever 168 turned clockwise, therefore, the trailing shutter curtain moves away from the exposing frame. A shutter charge lever 187 is arranged to charge the shutter. The shutter is thus charged in response to a charging action on the above-stated charge lever 158.

A sprocket 188 is arranged in a film passage which is not shown to have its projections engaged with the perforation provided in the film F. The sprocket thus rotates according as the film moves. A total of eight projections 188a are formed on the sprocket 188 to coincide with the perforation of one frame portion of the film. The sprocket 188 rotates 360 degrees while one frame portion of film is moved. A patternized substrate 189 is arranged to turn round together with the sprocket 188. A switch 190 is arranged to turn on when two contact pieces thereof come to ride on the conductive pattern part 189a of the substrate 189. A switch 191 is provided for detecting the presence or absence of film. It is on when the camera is not loaded with any film and turns off when the camera is loaded with a film F as the pushing part 192a of a film presence-or-absence detecting member 192 is pushed by the film F.

Figure 10:
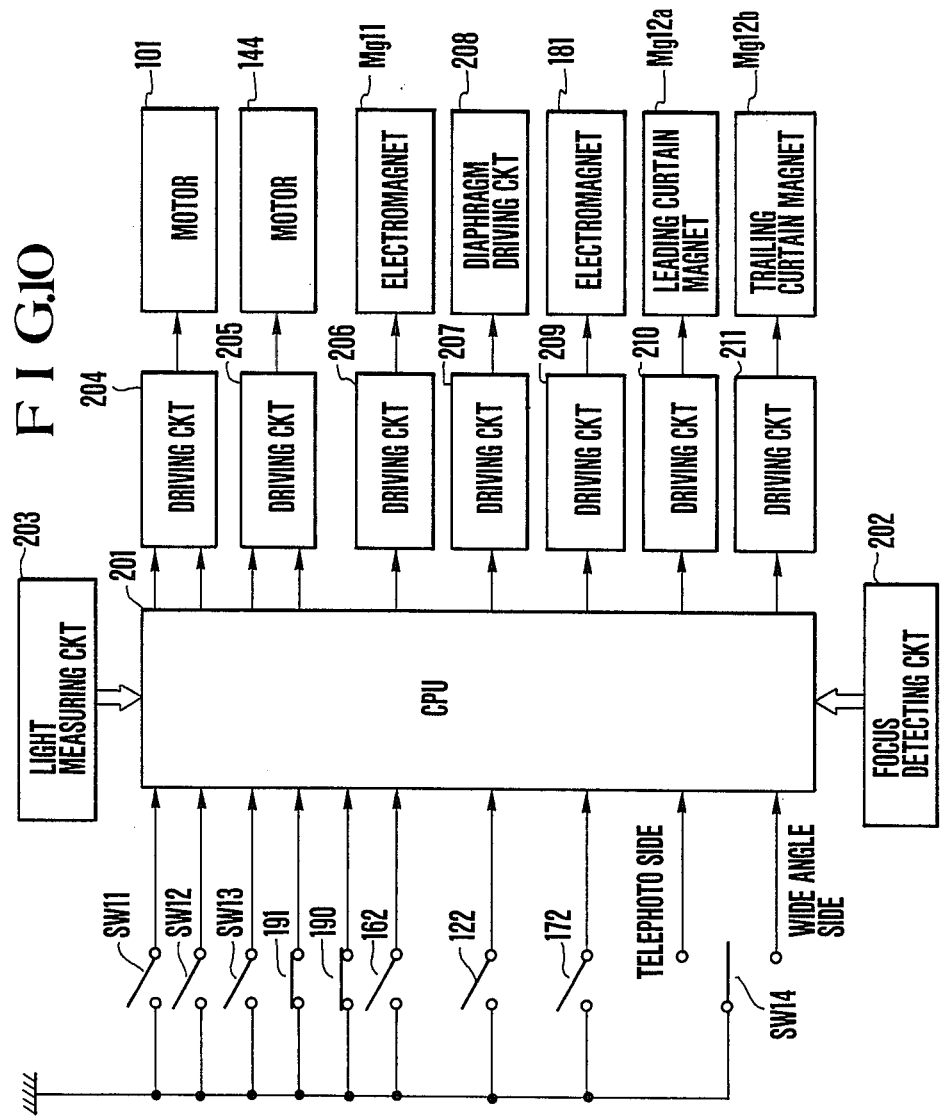
FIG. 10 is a circuit block diagram showing the third embodiment.

FIG. 10 shows the third embodiment of the invention in a block diagram. A switch SW11 is arranged to turn on in response to a first step stroke of an operation performed on a shutter release button which is not shown. A switch SW12 is arranged to turn on in response to a second step stroke of the operation on the release button. A switch SW13 is arranged to turn on upon completion of the travel of the trailing shutter curtain which is not shown and to turn off at the beginning of a charging operation performed using the above-stated motor 144 as a drive source. A switch SW14 is for a zooming operation and is arranged to be manually shiftable between a telephoto side position and a wide angle side position. A central processing unit (CPU) 201 is arranged to control driving circuits of varied kinds on the basis of signals received from the above-stated switches 122, 162, 172, 191 and SW11 to SW14 and information received from a focus detecting circuit 202 and a light measuring circuit 203. A driving circuit 204 is arranged to cause the motor 101 to rotate forward or backward according to a signal from the CPU 201. A driving circuit 205 is arranged to cause the motor 144 to rotate forward or backward according to a signal from the CPU 201. A driving circuit 206 is arranged to control a iris diaphragm device which is not shown in conjunction with a driving circuit 207, a diaphragm driving coil 208 and an electromagnet Mg11. When the power supply is effected to the electromagnet Mg11 is energized via the driving circuit 206, a stopper pawl which is not shown is disengaged therefrom. Then, when the diaphragm driving coil 208 is energized via a driving circuit 207, iris diaphragm blades which are not shown begin to move to stop down the aperture. Duing this stopping down process, the stopped down condition of the aperture is detected by means of a photo-coupler or the like. The power supply to the electromagnet Mg11 and the driving circuit 208 is cut off when the aperture reaches a predetermined value. The aperture is then kept at the predetermined value by the action of the above-stated stopper pawl performed against the force of a return spring. When the power supply is again effected to the electromagnet Mg11 after completion of an exposure, the stopper pawl is disengaged. Then, the return spring acts to bring the iris diaphragm blades back to their full open state. A driving circuit 210 is arranged to control a shutter which is not shown in conjunction with a driving circuit 211, a leading shutter curtain magnet Mg12a and a trailing curtain magnet Mg12b. When leading curtain magnet Mg12a receives a power supply via the driving circuit 210, a leading shutter curtain which is not shown travels. A trailing shutter curtain which is not shown travels when the power supply is effected to the trailing curtain magnet Mg12b via the driving circuit 211. Further, the above-stated embodiment can be dispensed with these various driving circuits if their functions are arranged to be performable within the CPU 201.

The embodiment operates as follows: In controlling the zoom driving and focus adjustment driving, the motor 101 is caused to rotate either forward or backward by the CPU 201 and the driving circuit 204 when the zooming switch SW14 is operated to select zooming to the telephoto side or to the wide angle side. The output of the motor 101 is transmitted to the sun gear 103 via the gear 104 and the reduction gear train which is not shown. In this instance, as shown in FIG. 7, the clutch lever 116 is located within the revolving locus of the stopper 107. The position of the stopper 107 is under restriction by the stopper parts 116a and 121a. Therefore, the planet gear 105 does not revolve even if the sun gear 103 then rotates clockwise. In other words, the output of the sun gear 103 is transmitted without fail to the rack part 112a of the sliding lever 112 via the planet gear 105 and the gears 110 and 111 irrespective of the direction in which the sun gear 103 (or the motor 101) rotates. Under the guidance of the guide pins 113a and 113b, the sliding lever 112 slides forward or backward. The zoom driving member 114 moves together with this sliding motion to perform a zooming operation on the photo-taking lens. After that, when either the selecting operation of the zooming switch SW14 comes to a stop or a zoom drivable end is detected by a telephoto end or wide-angle end detecting switch which is not shown, the power supply to the motor 101 is cut off. The zooming operation then comes to an end.

When the switch SW11 turns on in response to the first step stroke of a shutter release button which is not shown, the driving circuit 205 performs either forward or backward rotation control over the motor 144. The output of the motor 144 is transmitted via the gear 146 and the reduction gear which is not shown to the su gear 145. Then, since the arm 148 and the clamp lever 151 are acting on the planet gear 147 to restrict its position in a state of being engaged with a focus driving member 153 as shown in FIG. 7, the planet gear 147 does not revolve even if the sun gear 145 rotates clockwise. In other words, the output of the sun gear 145 is transmitted without fail to the focus driving member 153 irrespective of the direction in which the sun gear 145 (the motor 144) rotates.

In the case of FIG. 7, the camera is not loaded with any film and the switch 191 is in an on-state. However, the above-stated zooming and focusing control can be accomplished irrespective as to whether the switch 191 is on or off. When the camera is loaded with the film as in the case of FIG. 8, the pushing part 192a of the film detecting member 192 is pushed by the film F. This causes the switch 191 to turn off. Then, automatic film blank feeding control is performed in a known manner according to the off-state of the switch 191 and the on-state of a back lid opening detecting switch which is not shown. Even after completion of the film blank feeding process performed under the automatic blank feeding control, the zoom driving and focus driving control can be performed in the same manner as described in the foregoing as the switch 191 still remains off under that condition.

Figure 11:
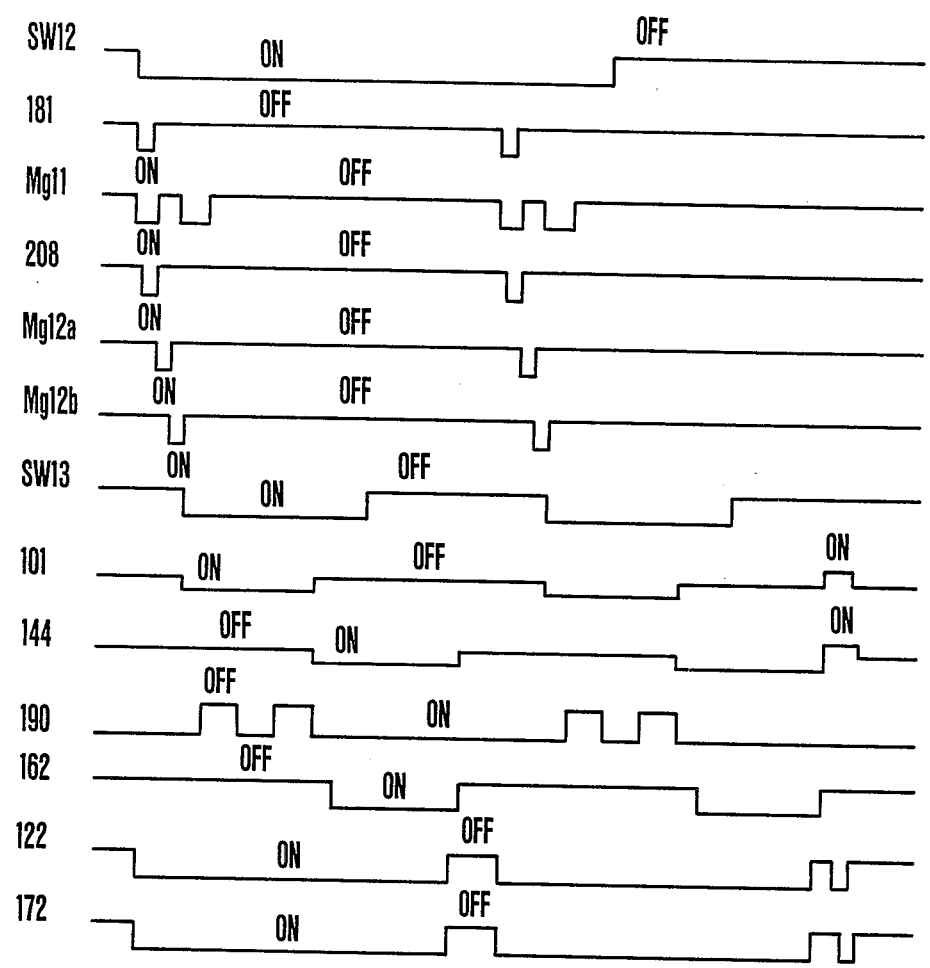
FIG. 11 is a time chart showing the operation of the circuit shown in FIG. 10.

Referring to FIG. 11 which is a time chart, after completion of the zoom driving and focus driving control, a series of photographing operations are performed as follows: In the case of FIG. 11, the switch SW12 is kept on by the second step stroke of the operation on the release button (not shown) for a continuous photographing operation (on two consecutive frames of film in this case). When the switch SW12 turns on, power supply is effected to the electromagnet 181 via the driving circuit 209. The electromagnet 181 is then demagnetized to release the armature 182 from its attraction. This allows the armature 182 to turn counterclockwise according to the urging force of the spring 179 together with the lever 177. The clamp lever 166 turns counterclockwise. This disengages the engaging part 163a of the clamp lever 166 from the engaging part 163a of the charge lever 163. The charge lever 163 turns counterclockwise according to the urging force of the spring 165. The change-over part 163b of the lever 166 pushes the clutch lever 116 against the force of the spring 119 to tur clockwise until the lever 116 comes to a point limited by the stopper 124. Then, the clutch lever 116 retreats to the outside of the revolving locus of the stopper 107. Meanwhile, the clutch lever 117 comes into the revolving locus of the stopper 107. The switch 122 then turns on. When the charge lever 163 turns counterclockwise, the lever 168 is released from the pushing action of the charge part 163c of the lever 163. The lever 168 is thus allowed to turn to an extent limited by the stopper 176. This actuates the shutter double shield removing lever 186. The lever 186 retracts the trailing shutter curtain to the outside of an exposing frame of film to release the shutter from the double light shielding state. The lever 167 turns according to the urging force of the spring 171 to an extent limited by the stopper 173. This causes the clamp lever 151 to turn counterclockwise against the force of the spring 152. The engaging part 151a of the lever 151 then disengages the engaging part 148a of the arm 148. The switch 172 then turns on. The lever 169 comes to turn round according to the urging force of the spring 179 until the bent up part 169a thereof abuts on the lever 177. The lever 169 then further turns clockwise in response to the clockwise turn of the lever 177 caused by the urging force of the spring 180. After that, the power supply to the electromagnet 181 is cut off to allow the magnet 181 to again attract the armature 182.

Approximately at the same time as the commencement of the power supply to the electromagnet 181, power supply is effected via the driving circuit 206 to the electromagnet Mg11. Following this, the power supply is also effected via the driving circuit 207 to the diaphragm driving coil 208. As a result, the stop pawl of a diaphragm device which is not shown is disengaged to allow the iris diaphragm blades to be moved to stop down the aperture. Following this, when the diaphragm aperture detecting member such as a photo-coupler detects that the aperture has been stopped down to a predetermined position, the power supply to the electromagnet Mg11 and the diaphragm driving coil 208 is cut off. Under that condition, the above-stated stopper pawl keeps the iris diaphragm blades at the aperture position. Upon completion of the above-described processes, the CPU 201 begins to perform driving control over the shutter which is not shown. More specifically, power supply is effected to the leading shutter curtain magnet Mg12a via the driving circuit 210. This releases the leading shutter curtain from a clamped state. The leading shutter curtain is thus allowed to travel. Following this, a shutter time value is computed on the basis of information received from the light measuring circuit 203. After the lapse of the computed shutter time, power supply is effected to the trailing curtain magnet Mg12b via the driving circuit 211. This releases the trailing shutter curtain from a clamped state which is not shown to cause it to travel. Upon completion of the travel of the trailing shutter curtain, the switch SW13 turns on. An exposing operation on the film then comes to an end.

With the switch SW13 having turned on as mentioned above, power supply to the motor 101 begins. The motor rotates in the direction of winding the film. The sun gear 103 begins to rotate clockwise. The clutch lever 116 is then outside of the revolving locus of the stopper 107. Therefore, the spring 108 and the spring retainer 109 caus the planet gear 105 to begin to revolve. Soon after that, the planet gear 105 comes to engage the toothed part 125c of the internal gear 125. Then, in the event of occurrence of inadequate engagement due to phase discrepancy between the teeth, a load developed by this discrepancy causes the internal gear 125 to rock within a range limited by a relation between the stopper slot 125a and the stopper 127. When a normal engaging state is restored, the restriction levers 128 and 129 and the spring 131 act to restrict the projection 125b of the internal gear 125, so that the gear 125 can be brought back to its normal position. During its revolving motion, the stopper 107 comes to abut on the clutch lever 117. However, since the stopper 107 has a revolving force corresponding to the output of the motor 101 by virtue of the engagement between the planet gear 105 and the internal gear 125, the stopper pushes the clutch lever 117 to turn it counterclockwise against the force of the spring 123 while furthering its revolution. Immediately before arrival at the stopper part 121b, the planet gear 105 and the internal gear 125 are disengaged from each other. The embodiment is arranged to prevent occurrence of an excessively large counterclockwise revolving force at the abutting faces of the clutch lever 117 and the stopper 107 at that point of time.

Therefore, the stopper 107 ca be caused to revolve by the force of the spring 108 until it reaches the stopper part 121b.

The planet gear 105 engages the gear 132 with the stopper 107 coming to abut on the stopper part 121b. Then, the clockwise rotation of the sun gear 103 is transmitted to the sun gear 135 via the planet gear 105, the transmission shaft 134 and the gear 133. The sun gear 135 begins to rotate counterclockwise. The planet gear 136 then comes to revolve until the stopper 138 comes to abut on a fixed stopper 138 which is not shown. Under that condition, the planet gear 136 engages the gear 139. The output of the planet gear 136 is transmitted via the gear 139 to the gear part 102a of the spool 102. The spool 102 rotates clockwise to take up the film thereon. This movement of the film causes the sprocket 188 to rotate clockwise. The patternized substrate 189 then also begins to turn likewise. The switch 190 detects the extent to which the film is moved to permit one frame portion of the film thus taken up on the spool. More specifically, the switch 190 is turned on before commencement of the film winding process. The switch 190 begins to repeat from that state to turn off, on and off. Following that, when next turning on of the switch 190 is detected by the CPU 201, the power supply to the motor 101 is cut off (see FIG. 11). This brings the process of winding up one frame portion of the film to an end.

When the power or current supply to the motor 101 is cut off, power supply is effected to the motor 144 via the driving circuit 204 to cause the sun gear 145 to rotate clockwise. At that instance, since the engaging part 151a of the clamp lever 151 is away from a position to engage the engaging part 148a of the arm 148, clockwise rotation of the sun gear 145 causes the planet gear 147 to revolve clockwise until it comes to a point at which the arm 148 is caused to abut on the stopper 154 by the action of the spring 149. The planet gear 147 engages the gear 155 at that point. In this instance, the positional relation among the members mentioned above is as shown in FIG. 8. Under the condition illustrated in FIG. 8, the output of the sun gear 145 is transmitted to the charge gear 156 via the planet gear 147, the gear 155 and a gear train which is not shown. The charge gear 156 then begins to rotate counterclockwise. Then, the projection 156a of the charge gear 156 comes to abut on the bent down part 158a of the charge lever 158. This causes the charge lever 158 to turn counterclockwise against the force of the spring 160. The switch 162 then turns on. During the turning motion of the charge lever 158, it comes to abut on the charge part 163c of the charge lever 163. Then, the charge or accumulation lever 163 turns round clockwise against the force of the spring 165. When the charge lever 163 turns clockwise, the changeover part 163b is retracted to allow the clutch lever 116 to turn counterclockwise according to the urging force of the spring 119 until it comes to abut on the stopper 120. Further, since the lever 167 is pushed by the charge part 163c of the lever 163, the lever 167 turns clockwise agains the force of the spring 171. The clamp lever 151 then turns clockwise according to the urging force of the spring 152 until its engaging part 151a reaches a point where it can engage the engaging part 148a. The part 163c of the charge or accumulation lever 163 pushes also the lever 168 to turn counterclockwise against the force of the spring 175 to remove the restriction imposed on the shutter double shielding removing lever 186. The lever 169 also turns counterclockwise to charge thereby the spring 179.

When the clockwise turning movement of the charge lever 163 comes to a predetermined charging position, the spring 184 acts to engage the engaging part 163a thereof with the engaging part 166a of the clamp lever 166. The shutter charge lever 187 is charged by the counterclockwise turning motion of the above-stated charge lever 158. Meanwhile, after the above-stated engagement of the engaging parts 163a and 166a, the charge gear 156 further turns to a slight extent as an over-charge action. Following this, the projection 156a of the gea 156 disengages the bent-down part 158a of the charge lever 158. This allows the charge lever 158 to turn round clockwise according to the urging force of the spring 160 until it again comes to abut upon the stopper 161. The switch 162 then turns off to cut off the power supply to the motor 144. Through these processes, the film winding operation and exposure-preparing mechanical charging operation come to an end.

In the case of a normal single-frame photographing operation, the motors 101 and 144 are driven to bring the embodiment back to the state of being capable of performing the zoom driving and focus driving operations after completion of winding the one-frame film portion and the mechanical charging operation as shown in FIG. 7. In this specific embodiment, the release button which is not shown is left in a state of having been pushed down to the first step stroke of the depressing operation as indicated in FIG. 11 and the switch SW12 is left in a on-state. This condition indicates that the embodiment is proceeding with a sequence of processes for continuous photographing. In the case of a photographing operation on the second of two consecutive frame portions of film under that continuous photographing condition, the embodiment operates as follows: In this instance, it not only causes a great loss of time but also changes the zoomed or focused condition from the initially set condition to bring the various members back to their initial states as shown in FIG. 7. To avoid such inconveniences, therefore, the embodiment is arranged as follows: The embodiment is fixed to the initially set zoomed or focused state for carrying out the continuous photographing operation on the second of the two consecutive frame portions of film. In other words, the planet gears 105 and 147 are left engaged with the gears 132 and 155 respectively in such a way as to permit the continuous photographing to be further performed on the above-stated second frame portion beginning from the initially set condition.

The continuous photographing operation on the second of the consecutive two frames begins with actuation of the light measuring circuit 203. A subequent series of processes beginning from power supply to the electromagnet 181 and including the control over the power supply to the motor 101 for film winding and power supply to the motor 144 for the mechanical chargeing processes are arranged to be performed in the same manner as described in the foregoing and are therefore omitted from the following description:

After completion of the photographing operation on the second frame, the charge lever 158 turns clockwise according to the urging force of the spring 160 in the manner as described in the foregoing. When the switch 162 turns off, it indicates that the photographing operation is not being continuously performed any longer. In that event, therefore power supplies begin respectively to the motor 101 which causes the sun gear 103 to rotate counterclockwise and to the motor 144 which causes the sun gear 145 to rotate counterclockwise. The clutch lever 117 is located outside of the revolving locus of the stopper 107 at that time as shown in FIG. 7. This allows the planet gear 105 to revolve counterclockwise and to come to engage the internal gear 125. In the event of occurrence of inadequate engagement of teeth, the spring 131, etc. act to restore normal engagement in the same manner as described in the foregoing. Further, the stopper 107 comes to abut on the clutch lever 116 during its revolving motion. However, the internal gear 125 acts to enable the stopper 107 to continue to revolve further by moving the clutch lever 116 against the force of the spring 119. The switch 122 then turns on and turns off when the stopper 107 comes to abut on the stopper part 121a (see FIG. 11). The CPU 201 detects the on- and off-states of the switch 122. Then, the power supply which has been effected via the driving circuit 204 to the motor 101 is cut off. The planet gear 105 is left in a state of engaging the gear 110. The sun gear 145 rotates counterclockwise to have the planet gear 147 caused to revolve counterclockwise by the force of the spring 149. During this revolution, the planet gear 147 comes to abut on the arm 148 and the clamp lever 151. However, the revolving force generated by the above-stated spring 149 enables the planet gear 147 to further revolve while causing the clamp lever 151 to turn counterclockwise against the force of the spring 152 The switch 172 then turns on. The switch 172 turns off when the planet gear 147 further revolves and comes to a point at which the engaging parts 148a and 151a of the arm 148 and the clamp lever 151 come to engage each other, i.e. when the arm 148 comes to abut on the stopper 150 (see FIG. 11). When the on- and off-states of the switch 172 are detected by the CPU 201, the power supply which has been effected to the motor 144 via the driving circuit 205 is cut off. The planet gear 147 is left in the state of engaging the focus driving member 153. The various members thus come back to their states as shown in FIG. 7.

With the on- and off-states of the switch SW12 detected as mentioned in the foregoing, the change-over sequence control is carried out to obtain the zoom and focus driving condition. After that, photographing processes are carried out in the same manner.

When a winding process on the last of the film frames begins after completion of last photographing, there takes place a tightly stretched state of film during the process of film winding. Then, the switch 190 no longer produces its on-and-off signal. In response to this change, the timer circuit within the CPU 201 begins to operate. After the lapse of a predetermined period of time from then, the power supply to the motor 101 in the film winding direction comes to a stop. Following that, a power supply in the film rewinding direction begins to cause the sun gear 103 to rotate counterclockwise. In this instance, since the stopper 107 has its position restricted jointly by the stopper parts 117b and 121b, the planet gear 105 and the gear 132 remains in the state of engaging the gear 132. Meanwhile, the counterclockwise output of the sun gear 103 is transmitted via the planet gear 105, the gear 132, the transmission shaft 134 and the gear 133 to the sun gear 135. The sun gear 135 then begins to rotate clockwise. The planet gear 136 revolves until it comes to a point where the spring which is not shown acts to cause the stopper 138 to abut on a fixed stopper which is also not shown. In other words, the planet gear 136 revolves and comes to engage the gear 141. Therefore, the output of the planet gear 136 is transmitted via the gear 141 to the gear 143. A rewinding member 142 which is in one unified body with this gear 143 begins to rotate counterclockwise. Film rewinding begins. The relative positions of these members are as shown in FIG. 9.

During the film rewinding process, the sprocket 188 rotates counterclockwise according as the film moves. In association with this, the patternized substrate 189 also rotates counterclockwise. The switch 190 then produces an on-off repeating signal. Upon completion of film rewinding, the switch 190 ceases to produce the signal. Then, the timer circuit begins to operate within the CPU 201. After the lapse of a predetermined period of time, the power supply which has been effected via the driving circuit 204 to the motor 101 is cut off. At the same time, a power supply is effected to the other motor 144 in the direction of causing the sun gear 145 to rotate clockwise. The mechanical charging operation is then performed in the same manner as described in the foregoing. When the switch 162 is detected to have turned off at the end of the charging operation, power supplies are effected to the motors 101 and 144 in the same manner as the last part of the sequence of processes shown in FIG. 11. This brings the embodiment back to the condition of FIG. 7 to ready it for the zoom driving and focus driving operation. In that instance, however, the planet gear 141 remains in the state of engaging the gear 141.

In accordance with the arrangement of this embodiment, in case that the focusing driving member 153 engages the planet gear device, the planet gear device is kept in that state by means of the clamp lever 151 and the stopper 150. Under that condition, the driving forces of forward and backward rotations can be transmitted. This permits and expansion of the transmission system for the driving force of the planet gear device. Further, the driving force charging or accumulating process on the clamp lever 151 is arranged to be performable by the rotation of the su gear 145 (or the motor 144) when the sun gear 145 is located in a position of transmitting the driving force through a transmission channel different from the channel used when the planet gear 147 is held by the clamp lever 151. This arrangement obviates the necessity of arranging such charging or accumulating means as an electomagnet or the like specially for the purpose of charging the clamp lever 151 with the driving force. The arrangement, therefore, saves energy consumption. While the driving force accumulation for the clamp lever 151 which is movable back and forth is obtained from the output of the motor 144, the electromagnet 181 is arranged to be used for driving start control. That arrangement requires less amount of energy than direct driving arrangement using a plunger or the like. Besides, the arrangement of this embodiment dispenses with provision of an impact absorbing device to permit simpler structural arrangement and to permit reduction in the space required. The arrangement to use the electromagnet 181 for controlling the start of driving enables the electromagnet 181 to be usable also for other mechanical charging purpose or the like, so that the cost of the camera can be reduced. Since the motor 144 is arranged to be used for charging the clamp lever 151 with the driving force, the motor 144 can be arranged to be used also for driving other clutch device as in the case of FIGS. 7, 8 and 9. The features of the third embodiment which is arranged as described above are summarized as follows:

(1) The embodiment comprises the sun gear; the planet gear revolvable round the sun gear; the first and second preset position restricting means (the stoppers 150 and 154) for restricting, to the first and second position, the revolution of the planet gear which takes place in the first or second direction according as the sun gear rotates in the first or second direction; blocking means which is switchable between a blocking state and a non-blocking state and is arranged, in the blocking state, to block the revolution of the planet gear from the second preset position to the first preset position; driving force accumulating means (the gear 155, charge gear 156, charge lever 158 and charge or accumulating lever 163) for accumulating a driving force required for shifting the state of the blocking means by the rotation of the sun gear in the first direction when the planet gear is in the first preset position; and driving starting means (the electromagnet 181) for causing the driving force accumulated by the driving force accumulating means to be used for shifting the state of the blocking means. The sun gear is arranged to be rotatable either forward or backward with the planet gear in the second preset position at which the planet gear is blocked by the blocking means. The driving force for shifting the state of the blocking means is arranged to be obtained from the rotation of the sun gear in the first direction. The embodiment permits the independent driving force transmission system for the planet gear device to be enlarged with relatively simple structural arrangement without recourse to any special driving force generating means.

(2) The embodiment comprises the first motor (or the motor 101); a film driving force transmission channel (the gears 132 to 139 and gears 141 to 143) which is arranged to transmit the output of the first motor for driving the film; a zoom driving force transmission channel (the gears 110 and 111, the sliding lever 112 and the zoom driving member 114) which is arranged to transmit the output of the first motor to the photo-taking lens to drive it for zooming; first clutch means for selectively connecting the film driving force transmission channel or the zoom driving force transmission channel to the first motor, the first clutch means including the sun gear 103, the planet gear 105, the arm 106, the spring 108, the spring retainer 109, the clutch levers 116 and 117 and the stopper member 121; a second motor (or the motor 144); a focus driving force transmission channel (the focus driving member 153) which is arranged to transmit the output of the second motor to the phototaking lens to drive it for focusing; an exposure preparation driving force transmission channel (including the gear 155, the charge gear 156, the charge lever 158, the accumulation lever 163, the clamp lever 166, the levers 168, 169 and 177, the shutter double shield removing lever 186 and the shutter charge lever 187) which is arranged to transmit the output of the second motor to the exposure preparation driving member to drive arrangement for an exposure; and second clutch means (including the sun gear 145, the planet gear 147, the arm 148, the spring 149, the stopper 150, the clamp lever 151, the stopper 154 and the lever 167) which is arranged to selectively connect the focus driving force transmission channel or the exposure preparation driving force transmission channel to the second motor. The first motor is used for a zooming operation to be performed prior to photographing and for a film driving operation to be performed after photographing. Meanwhile, a focus driving operation and photographing preparation driving operation which are similarly combined are arranged to be performed by means of the second motor. Therefore, many functions can be efficiently accomplished with a few number of motors.

(3) The embodiment comprises the sun gear; the planet gear which is arranged to be revolvable round the sun gear; the first and second position restricting means (the stopper parts 121a and 121b) which are arranged to restrict, to the first or second preset position, the revolution of the planet gear taking place in the first or second direction according as the sun gear rotates in the first or second direction; first and second blocking means which are shiftable between a blocking state and a non-blocking state and are arranged such that, in the blocking state, the revolution of the planet gear from the first preset position to the second preset position and from the second to the first by these first and second blocking means respectively; and shifting and holding means (including the spring 119, the motor 144, the sun gear 145, the planet gear 147, the charge gear 156, the charge lever 158, the accumulation lever 165, the spring 165, the clamp lever 166, the levers 169 and 177, the electromagnet 181 and the armature 182) which is arranged to shift each of the first and second blocking means from one state to the other and to have the new state maintained by means of a spring force. When the planet gear is either in the first or second preset position in which it is restricted from revolving, the blocking state of the first and second blocking means is arranged to be maintainable without recourse to electrical energy. The rotation of the drive source, therefore, can be transmitted without fail and without increasing electric energy consumption for that purpose.

(4) The embodiment comprises the motor; a lens driving force transmission channel (including the gears 110 and 111, the sliding lever 112, the zoom driving member 114 and the focus driving member 153) which is arranged to transmit the output of the motor to the photo-taking lens; a photographing preparation driving force transmission channel (including the gears 132 to 139, 141 to 143 and 155, the charge gear 156, the charge lever 158, the accumulation lever 163, the clamp lever 166, the levers 168, 169 and 177, the electromagnet 181, the shutter double shield removing lever 186 and the shutter charge lever 187) which is arranged to transmit the output of the motor to the photographing preparation driving member; clutch means (including a series of members from the sun gear 103 to the spring retainer 109 with the exception of the gear 104, the clutch levers 116 and 117, the stopper member 121, the sun gear 145, the planet gear 147, the arm 148, the spring 149, the stopper 150, the clamp lever 151, the stopper 154 and the lever 167) which is arranged to be normally in a position to connect the output of the motor to the above-stated lens driving force transmitting channel and to be in another position of connecting it to the above-stated photographing preparation driving force transmitting channel at the time of photographing; and clutch change-over control means (including the CPU 201 and the driving circuits 204 and 205) which is arranged to shift the position of the clutch means to the side of the lens driving force transmitting channel upon completion of photographing in the case of a single-frame photographing operation and to inhibit the clutch means from returning to the side of the lens driving force transmitting channel upon completion of photographing for one frame in the event of a continuous photographing operation. The clutch means is thus arranged to remain inoperative while the continuous photographing operation is in process. Therefore, during continuous photographing, the initially set values of photographing information of varied kinds can be retained to shorten a time interval between one performance of photographing and another.

Figure 12B:
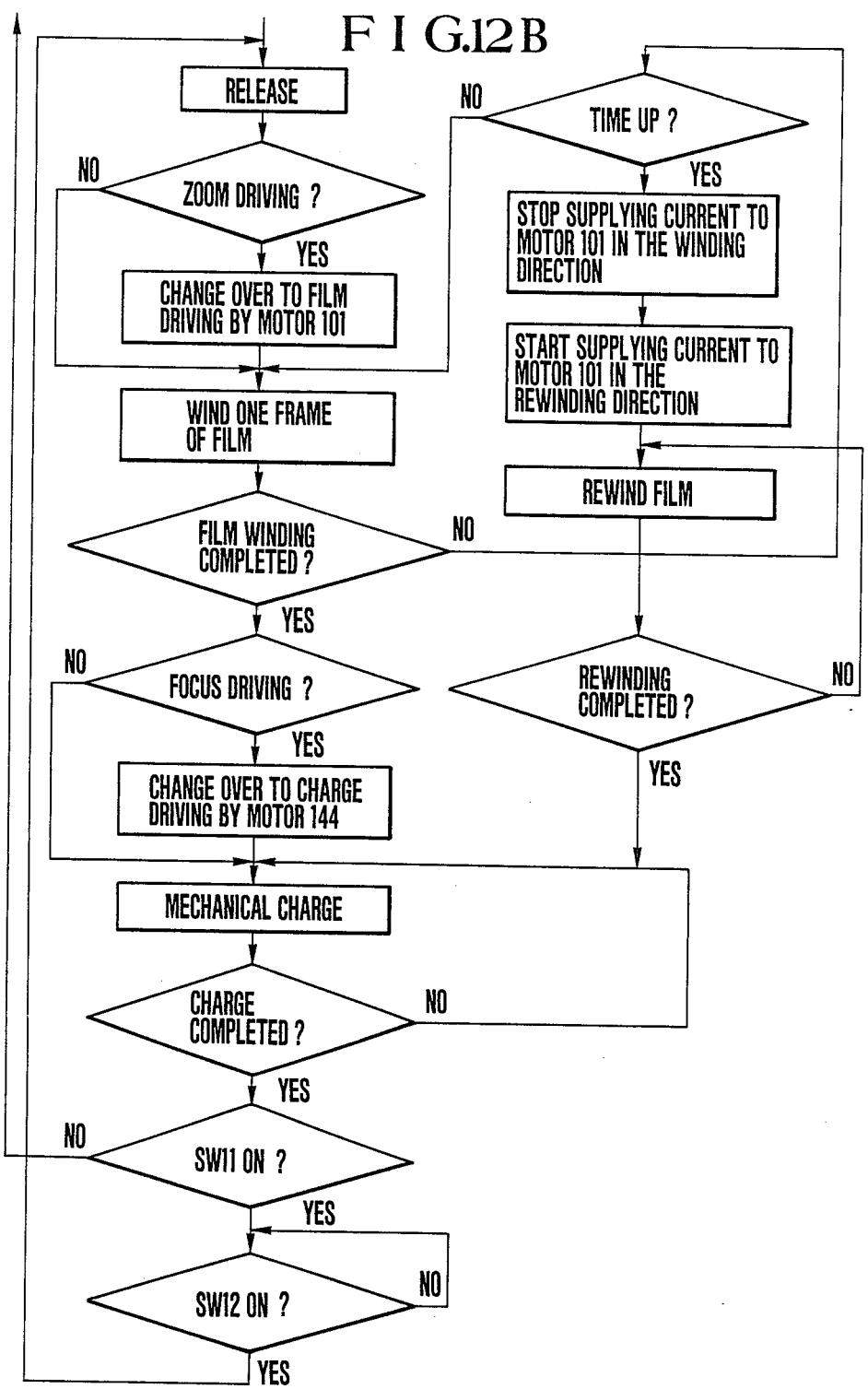

A fourth embodiment of this invention is arranged as described below with reference to FIGS. 12A and 12B which are flow charts:

In this case, the circuits of the third embodiment shown in FIG. 10 ar arranged to be operated in a different sequence. Other FIGS. 7 to and 10 will be also referred to for the description together with FIGS. 12A and 12B.

First, the operation for zoom and focus driving control is as follows: When the zooming switch SW14 is operated, the CPU 201 and the driving circuit 204 supply the motor 101 with a current which causes the sun gear 103 to rotate counterclockwise. The sun gear 103 begins to rotate counterclockwise. Then, the planet gear 105 revolves counterclockwise until the stopper 107 comes to abut on the stopper part 121a by pushing the stopper part 116a of the clutch lever 116 to the outside of its revolving locus against the force of the spring 123. The switch 122 turns on when the stopper part 116a of the clutch lever 116 is thus relocated outside of the revolving locus. With the switch 122 turned on, the CPU 201 detects completion of change-over to zoom driving. (After pushing the stopper part 116a to the outside of the revolving locus, the stopper 107 further revolves by the force of inertia until it comes to abut on the stopper part 121a.) Following this, in accordance with the zooming direction selecting state of the zooming switch SW14 (telephoto side or wide angle side), a zooming operation on the lens begins. In other words, control is performed over the forward or backward rotating driving action of the motor 101. The above-stated change-over causes the planet gear 105 to engage the gear 110. An impact resulting from this engagement somewhat moves the zoom driving system. This impact, however, gives no disagreeable feeling to the photographer, because the zooming operation is intentionally performed. The zooming begins immediately after the change-over in the intended direction.

The forward or reverse rotation output of the motor 101 is again transmitted to the sun gear 103. At that time, the clutch lever 116 has already entered the revolving locus of the stopper 107 as shown in FIG. 7. Since the position of the stopper 107 is restricted by the stopper parts 116a and 121a, the planet gear 105 does not revolve even if the sun gear 103 rotates clockwise. In other words, irrespective of the rotating direction of the sun gear 103 (or the motor 101), the output of the sun gear 103 is then transmitted without fail to the rack part 112a of the sliding lever 112 via the planet gear 105 and the gear 110. The sliding lever 112 slides either forward or backward being guided by the guide pins 113a and 113b. The zoom driving member 114 which is unified in one body with the sliding lever 112 also begins to move in a manner similar to the latter to accomplish a zooming operation on the photo-taking lens. After that, when the end of a zoom drivable range is detected by a telephoto end or wide-angle end detecting switch which is not shown, the power supply to the motor 101 is cut off and the zooming operation comes to an end.

Next, when an operation on a release button which is not shown is performed to the first step stroke thereof, the switch SW11 turns on. Then, the CPU 201 and the driving circuit 144 cause a current to be supplied to the motor 144 in the direction of causing the sun gear 145 to rotate counterclockwise. Accordingly, the sun gear 145 begins to rotate counterclockwise. The planet gear 147 then revolves counterclockwise until the arm 148 comes to abut on the stopper 150 by pushing aside the clamp lever 151 against the force of the spring 152. Further, as mentioned above, the switch 172 turns on at the point of time when the clamp lever 151 is pushed aside by the arm 148. With the switch 172 having thus turned on, the CPU 201 detects completion of change-over to focus driving. Following this, control over the forward or reverse rotation driving by the motor 144 is performed on the basis of focus information obtained by the focus detecting circuit 202. (By then, light measurement information has been also obtained by the light measuring circuit 203 together with the focus information.) At the time of this change-over operation, like in the case of the above-stated change-over to zoom driving, the focus driving system is somewhat moved by an impact resulting from engagement between the planet gear 147 and the focus driving member 153. However, since the focus driving operation is being intentionally performed, the above-stated impact gives no disagreeable feeling to the photographer. The forward or reverse rotation output of the motor 144 is again transmitted to the sun gear 145. At this time, the arm 148 and the clamp lever 151 jointly act to restrict the position of the planet gear 147 and to keep it in a state of engaging the focus driving member 153 as shown in FIG. 7. Therefore, the planet gear 147 then does not revolve even if the sun gear 145 rotates clockwise. In other words, irrespective of the rotating direction of the sun gear 145 (or the motor 144), the output of the sun gear 145 is transmitted without fail to the focus driving member 153 via the planet gear 147.

Further, in the case of FIG. 7, the camera is not loaded with any film and the switch 191 is in an on-state. However, the zoom and focus driving control described above is possible irrespective of the condition of the switch 191. When the camera is loaded with the film F as shown in FIG. 8, the film F pushes the pushing part 192a of the film detecting member 192. This causes the switch 191 to be in an off-state. It is well known to perform automatic film blank feeding control according to the off-state of the switch 191 and the on-state of a back-lid closing detecting switch which is not shown. Even after completion of film blank feeding performed under the automatic blank feeding control, the zoom and focus driving control can be performed as there obtains the same condition as FIG. 7 with the exception of only that the switch 191 is in an off-state instead of the on-state.

A series of photographing processes subsequent to the zoom and focus driving control are as follows: When the on-state of the switch SW12 and completion of the detection of the focus information and the light measurement information have been confirmed, a current is supplied via the driving circuit 209 to the electromagnet 181. This demagnetizes the electromagnet 181 to deprive it of the attracting force on the armature 182. The armature 182 is allowed to turn counterclockwise together with the lever 177 according to the urging force of the spring 179. The clamp lever 166 turns also counterclockwise. The engaging part 166a of the clamp lever 166 disengages from the engaging part 163a of the accumulation lever 163. This allows the accumulation lever 163 to turn counterclockwise according to the urging force of the spring 165. The change over part 163b of the lever 163 then pushes the clutch lever 116 to turn clockwise against the force of the spring 119 until it comes to a point where its position is restricted by the stopper 124. The clutch lever 116 then retreats to the outside of the revolving locus of the stopper 107 while the clutch lever 117 comes within the revolving locus. The switch 122 then turns on and continuously remains on. When the accumulation lever 163 turns counterclockwise as mentioned above, the charge part 163 of the lever releases the lever 168 from its pushing action on the latter. Therefore, the lever 168 turns round according to the urging force of the spring 175 until its further turn is restricted by the stopper 176. This actuates the shutter double shield removing lever 186 to have the trailing shutter curtain retracted from the frame to be exposed to light. By this, the double light shielding state is removed. The lever 167 turns according to the urging force of the spring 171 until its position is restricted by the stopper 173. This causes the clamp lever 151 to turn counterclockwise against the force of the spring 152. The engaging part 151a disengages the engaging part 148a of the arm 148. The switch 172 then turns on and continuously remains on. The lever 169 turns according to the urging force of the spring 179 until the bent up part 169a comes to abut on the lever 177 and further turns counterclockwise in association with the clockwise turn of the lever 177 caused by the urging force of the spring 180. After that, the armature 182 is again attracted by the electromagnet 181 when the power supply to the electromagnet is cut off.

Further, at about the same time as when the power supply to the electromagnet 181 begins, a power supply is effected via the driving circuit 206 to the electromagnet Mg11. Following that, a power supply is also effected via the driving circuit 207 to the diaphragm driving coil 208. This disengages the stopper claw of the diaphragm device which is not shown. The aperture formed by the diaphragm blades which are not shown is stopped down. Then, when a diaphragm aperture detecting member such as a photo-coupler or the like detects that the aperture has been stopped down to a predetermined position, the power supplies to the electromagnet Mg11 and the diaphragm driving coil 208 are cut off. The above-stated stopper claw then acts to keep the diaphragm blades in this condition. The aperture is, therefore, kept in a predetermined stopped down state. Upon completion of the operation described above, the CPU 201 initiates shutter driving control. First, a power supply is effected via the driving circuit 210 to the leading shutter curtain magnet Mg12a. By this, a clamped condition which is not shown is undone. A leading shutter curtain which is not shown is allowed to travel. Following that, a shutter time is computed on the basis of light measurement information obtained by the light measuring circuit 203. After the lapse of the shutter time thus computed, a power supply is effected via the driving circuit 211 to the trailing shutter curtain magnet Mg12b. A clamped condition which is not shown is undone by this. A trailing shutter curtain which is not shown is then allowed to travel. Upon completion of the travel of the trailing shutter curtain, the switch SW13 turns on. An exposing operation on the film thus comes to an end.

With the switch SW13 thus turned on, if the switch 122 is in an on-state at that time, a current is immediately supplied to the motor 101. Then, the motor 101 rotates in the direction of winding up the film. The sun gear 103 begins to rotate clockwise. The clutch lever 116 is then located outside of the revolving locus of the stopper 107. The spring 108 and the spring retainer 109 then jointly act to allow the planet gear 105 to revolve clockwise. Shortly after commencement of the revolution of the planet gear 105, the gear 105 comes to engage the toothed part 125c of the internal gear 125. Then, in the event of the imposition of a load resulting from inadequate engagement of teeth due to a discrepancy in phase, the internal gear 125 is allowed to sway within a range defined by the stopper slot 125a and the stopper 127 and to come back to a normal engaged state. Then, the gear comes back to a middle position as the position of the projection 125b thereof is restricted by the restricting levers 128 and 129 and the spring 131. During the revolving motion, the stopper 107 comes to abut on the clutch lever 117. However, the revolving force of the stopper 107 is equivalent to the output of the motor 101 as the sun gear 105 engages the internal gear 125. Therefore, the stopper 107 further revolves causing the clutch lever 117 to turn counterclockwise against the force of the spring 123. The planet gear 105 disengages the internal gear 125 immediately before arrival of the stopper 107 at the stopper part 121b. The embodiment is arranged such that, at this point of time, no excessive counterclockwise revolving force develops at the abutting faces of the clutch lever 117 and the stopper 107 to allow the stopper 107 to be brought to the stopper part 121b by the action of the spring 108.

The planet gear 105 engages the gear 132 with the stopper 107 abutting on the stopper part 121b. The clockwise rotation of the sun gea 103 is then transmitted to the sun gear 135 via the planet gear 105, the transmission shaft 134 and the gear 133. This causes the sun gear 135 to begin to rotate counterclockwise. The counterclockwise rotation of the sun gear 135 causes the planet gear 136 to revolve until the stopper 138 comes to abut on a fixed stopper which is not shown. Then, the planet gear 136 engages the gear 139. The output of the planet gear 136 is thus transmitted via the gear 139 to the gear part 102a of the spool 102. The spool 102 is thus caused to rotate clockwise to take up the film. The movement of the film causes the sprocket 188 to rotate clockwise. The patternized substrate 189 also begins to rotate likewise. One frame portion of the film is thus taken up with the feeding amount of film detected by means of the switch 190. Further details are as follows: The switch 190 turns on when film winding begins and, starting from this point of time, repeatedly turns off, on and off. Then, when the CPU 201 detects that the switch 190 turns on next time, the power supply to the motor 101 is cut off to bring the winding process on one-frame portion of the film to an end.

After the discontinuation of the power supply to the motor 101, if the switch 172 is in an on-state, a current is immediately supplied via the driving circuit 204 to the motor 144 in the direction of causing the sun gear 145 to rotate clockwise. At that time, the engaging part 151a of the clamp lever 151 is away from a position of engaging the engaging part 148a of the arm 148. Therefore, with the sun gear 145 rotated clockwise, the planet gear 147 revolves clockwise to a point where the arm 148 is caused by the force of the spring 149 to abut on the stopper 154. The planet gear 147 engages the gear 155 there. The relative positions of various members under this condition are a shown in FIG. 8. Under this condition, the output of the sun gear 145 is transmitted to the charge gear 156 via the planet gear 147, the gear 155 and a gear train which is not shown. The charge gear 156 begins to rotate counterclockwise. Then, the projection 156a of the gear 156 comes to abut on the bent-down part 158a of the charge lever 158. This causes the charge lever 158 to turn counterclockwise against the force of the spring 160. The switch 162 then turns on. During its turning motion, the charge lever 158 comes to abut on the charge part 163c of the accumulation lever 163. The lever 163 is caused by this to turn clockwise against the force of the spring 165. Then, with the change-over part 163b of the accumulation lever 163 retracted by the clockwise turning motion of the lever 163, the clutch lever 116 is allowed to turn round counterclockwise according to the urging force of the spring 119 until it comes to abut on the stopper 120. Further, since the lever 167 is pushed by the charge part 163c of the lever 163, the lever 167 is thus turned clockwise against the force of the spring 171. The clamp lever 151 is then allowed to turn clockwise according to the force of the spring 152 until its engaging part 151a comes to a point where it can engage the engaging part 148a of the arm 148. The lever 168 is also pushed by the charge part 163c to turn counterclockwise against the force of the spring 175. The restriction imposed by the shutter double shield removing lever 186 is thus undone. The lever 169 also turns counterclockwise to charge the spring 179.

When the clockwise turning motion of the accumulation lever 163 comes to a predetermined charging position, the spring 184 acts to cause the engaging part 163a of the lever 163 to engage the engaging part 166a of the clamp lever 166. The counterclockwise turn of the charge lever 158 charges the shutter charge lever 187. Meanwhile, the charge gear 156 further rotates to a slight extent as an over-charge action after the engaging parts 163a and 166a have engaged each other. After that, the projection 156a disengages from the bent-down part 158a of the charge lever 158. This allows the charge lever 158 to turn clockwise again until it comes to abut on the stopper 161 according to the urging force of the spring 160. The switch 162 then turns off. With the switch 162 turned off, the power supply to the motor 144 is cut off. Through these processes, the film winding operation and the mechanical charging operation are accomplished in preparation for photographing.

Upon completion of winding one frame portion of film and mechanical charging, the position of the release switch which is not shown, that is, whether the switches SW11 and SW12 remain in their on-states is detected. If each of these switches is found in its on-state, the embodiment proceeds to continuous photographing. Photographing for the second frame under the continuous photographing operation begins on the basis of the light measurement information obtained for the first frame by the light measuring circuit 203. In this instance, the embodiment omits the processes of bringing various members back to their states shown in FIG. 7. Therefore, the film winding operation and the mechanical charging operation can be performed immediately after completion of each photographing operation and subsequent photographing operations can be carried on in the same manner.

When a winding operation on the last frame portion of film begins after completion of the last photographing operation, a tightly stretched state of the film takes place during the winding process, as shown in FIG. 8. The switch 190 then ceases to produce the predetermined on-off signal. This actuates the timer circuit of the CPU 201. After the lapse of a predetermined period of time, the power supply to the motor 101 comes to a stop. Then, a current is supplied to the motor, this time, in the direction of causing the sun gear 103 to rotate counterclockwise for rewinding the film. The stopper 107 has its position restricted by the stopper parts 117b and 121b at that time. Therefore, the planet gear 105 is left in a state of engaging the gear 132. This permits the counterclockwise rotation output of the sun gear 103 to be transmitted to the sun gear 135 via the planet gear 105, the gear 132, the transmission shaft 134 and the gear 133. The sun gear 135 begins to rotate clockwise. The planet gear 136 revolves until the stopper 138 is caused by the action of a spring which is not shown to abut on a fixed stopper which is also not shown. In other words, the planet gear 136 thus comes to engage the gear 141. The output of the planet gear 136 is thus transmitted via the gear 141 to the gear 143 which is in one unified body with the rewinding member 142. The rewinding member 142 rotates counterclockwise to initiate film rewinding. The positions of various members at that point of time are as shown in FIG. 9.

During the film rewinding operation, the sprocket 188 rotates counterclockwise according as the film moves. In association with this, the patternized substrate 189 also rotates counterclockwise to cause the switch 190 to produce an on-and-off repeating signal. Upon completion of film rewinding, the switch 190 ceases to produce the on-and-off repeating signal. Then, the timer circuit operates within the CPU 201. After the lapse of a predetermined period of time, the power supply which has continued to be effected to the motor 101 via the driving circuit 204 comes to a stop. At the same time, a power supply is effected to the motor 144 in the direction of causing the sun gear 145 to rotate clockwise. As a result, the mechanical charging operation is performed in the manner a mentioned in the foregoing. After that, when the off-states of the switches 162 and SW11 are detected, the embodiment comes back to the initial condition thereof as shown in FIG. 12. In other words, the embodiment enters a stand-by state in its start position.

In accordance with the arrangement of this embodiment, the change-over to the zoom driving or focus driving operation by means of the motor 101 or 144 is arranged to be possible only in the event of an intentional change-over operation. The driving operation is arranged to be immediately carried out after the change-over. A slight degree of fluctuations arising from the change-over, therefore, never appears as an unnatural movement to the photographer, so that the motor-operated camera according to this invention gives no disageeable feeling and ensures an operation feeling agreeable to the human sensitivity.

Further, the embodiment is arranged to perform zoom driving or focus driving after completion of the change-over. This arrangement obviates the necessity of making correction of the slight degree of changes incidental to the change-over. Therefore, the photographing conditions remain unchanged by such correction that is otherwise necessary. The arrangement is also advantageous in terms of circuit arrangement.

In accordance with this invention as described in the foregoing, a single motor can be used for both forward and reverse driving operations and further can be used for separately driving another part. The invented arrangement not only increases efficiency in use of the limited space available within a camera but also permits reduction in cost of the camera.

What is claimed is:

1. An electronic motor operated camera comprising:
   (a) a first motor;
   (b) a film driving force transmission system for transmitting the output of said first motor to a film driving member;
   (c) a zoom driving force transmission system for transmitting the output of said first motor to a photo-taking lens for zooming operation thereon;
   (d) first clutch means for selectively connecting said film driving force transmission system or said zoom driving force transmission system to the output of said first motor;
   (e) a second motor;
   (f) a focus driving force transmission system for transmitting the output of said second motor to said photo-taking lens for a focusing operation thereon;
   (g) an exposure preparation driving force transmitting system for transmitting the output of said second motor to an exposure preparation driving member for driving preparation for an exposure; and
   (h) second clutch means for selectively connecting said focus driving force transmission system or said exposure preparation driving force transmission system to the output of said second motor, wherein at least one of said first and second clutch means is arranged to be a planetary clutch device.

2. A camera according to claim 1, further comprising: blocking means for blocking the selective connecting action of at least one of said first and second clutch means.

3. A camera according to claim 1, further comprising: blocking means for blocking the revolution of the planet gear of said planetary clutch device, said blocking means being arranged to block said revolution when either said blocking means or said planet gear is in a state of engaging said transmission system.

4. An electric motor operated camera of the kind permitting selection between a single frame photographing operation and a continuous photographing operation, comprising:
   (a) a motor;
   (b) a lens driving force transmission system for transmitting the output of said motor to a photo-taking lens;
   (c) an exposure preparation driving force transmission system for transmitting the output of said motor to an exposure preparation driving member;
   (d) clutch means for connecting the output of said motor to said lens driving force transmission system under a normal condition and to said exposure preparation driving force transmission system under a photo-taking condition, said clutch means being arranged to be a planetary clutch device; and
   (e) clutch operation control means for controlling the connection switching operation of said clutch means, said control means being arranged to cause said clutch means to shift the connecting state thereof from a state of connecting said exposure preparation driving force transmission system to the other state of connecting said lens driving force transmission system upon completion of an exposure in the single frame photographing operation and to prohibit said clutch means from shifting the connection to said lens driving force transmission system after an exposure in the event of the continuous photographing operation.

5. An electric motor operated camera comprising:
   (a) a motor;
   (b) a lens driving force transmission system for transmitting the output of said motor to a photo-taking lens;
   (c) an exposure preparation driving force transmission system for transmitting the output of said motor to an exposure preparation driving member;
   (d) clutch means for selectively connecting the output of said motor either to said lens driving force transmission system or to said exposure preparation driving force transmission system, said clutch means being arranged to connect the output of said motor to said exposure preparation driving force transmission system in the event of photographing, said clutch means being arranged to be a planetary clutch device; and
   (e) clutch operation control means for controlling the connection switching operation of said clutch means, said control means being arranged to determine the necessity of switching the connecting state of said clutch means upon completion of an exposure preparing operation performed by the rotation of said motor after an exposure and to control the connection switching operation of said clutch means on the basis of the result of said determination.

6. A camera according to claim 5 wherein said clutch operation control means is arranged to keep said clutch means in a state of connecting the output of said motor to the exposure preparation driving force transmission system if an instruction for exposing a next frame portion of film is obtained upon completion of said exposure preparing operation; and to cause said clutch means to connect the output of said motor to said lens driving force transmission system in case that the instruction for exposing the next frame portion of film is not obtained at the point of time when said exposure preparing operation is completed but is obtained after that point of time.

7. An electronic motor operated camera, comprising:
   (a) a first motor;
   (b) a film driving force transmission system for transmitting an output of said first motor to a film driving member;
   (c) a zoom driving force transmission system for transmitting the output of said first motor to a photo-taking lens for zooming operation thereon;
   (d) a second motor;
   (e) a focus driving force transmission system for transmitting an output of said second motor to said photo-taking lens for a focusing operation therein;
   (f) an exposure preparation driving force transmitting system for transmitting the output of said second motor to an exposure preparation driving member driving preparation for an exposure; and
   (g) clutch means for selectively connecting said transmission systems to said first and second motors, said clutch means comprising a first clutch construction for selectively connecting said film driving force transmission system or said zoom driving force transmission system to the output of said first motor, a second clutch construction for selectively connecting said focus driving force transmission system or said exposure preparation driving force transmission system to the output of said second motor, wherein at least one of said first and second clutch constructions is arranged to be a planetary clutch device, and blocking means for blocking a revolution of a planet gear of said planetary clutch device, said blocking means blocking said revolution in a state where said planet gear is engaged with either one of said transmission systems.

8. A camera according to claim 7, wherein both of said first and second clutch constructions are arranged to be a planetary clutch device and which further comprises blocking means for blocking revolution of the planet gear of each of the planetary clutches.

9. An electric motor operated camera of the kind permitting election between a single frame photographing operation and a continuous photographing operation, comprising:
 (a) a motor;
 (b) a lens driving force transmission system for transmitting an output of said motor to a photo-taking lens;
 (c) an exposure preparation driving force transmission system for transmitting the output of said motor to an exposure preparation driving member;
 (d) a planetary clutch device for connecting the output of said motor to said lens driving force transmission system under a normal condition and to said exposure preparation driving force transmission system under a photo-taking condition; and
 (e) clutch operation control means for controlling the connection changing operation of said planetary clutch device, said control means being arranged to cause said planetary clutch means to shift the connecting state thereof from a state of connecting said exposure preparation driving force transmission system to another state of connecting said lens driving force transmission system upon completion of an exposure in the single frame photographing operation and to prohibit said planetary clutch device from shifting the connection to said lens driving force transmission system after an exposure in the event of a continuous photographing operation.

10. An electric motor operated camera comprising:
 (a) a motor;
 (b) a lens driving force transmission system for transmitting an output of said motor to a photo-taking lens;
 (c) an exposure preparation driving force transmission system for transmitting the output of said motor to an exposure preparation driving member;
 (d) a planetary clutch device for selectively connecting the output of said motor either to said lens driving force transmission system or to said exposure preparation driving force transmission system, said planetary clutch device being arranged to connect the output of said motor to said exposure preparation driving force transmission system in the event of photographing; and
 (e) clutch operation control means for controlling the connection changing operation of said planetary clutch device, said control means being arranged to determine the necessity of changing the connecting state of said planetary clutch device upon completion of an exposure preparing operation performed by the rotation of said motor after an exposure and to control the connection changing operation of said planetary clutch device on the basis of the result of said determination.

11. A camera according to claim 10, wherein said clutch operation control means is arranged to keep said planetary clutch device in a state of connecting the output of said motor to the exposure preparation driving force transmission system if an instruction for exposing a next frame portion of film is obtained upon completion of said exposure preparing operation; and to cause said planetary clutch device to connect the output of said motor to said lens driving force transmission system in case the instruction for exposing the next frame portion of film is not obtained at the point of time when said exposure preparing operation is completed but is obtained after that point of time.

* * * * *